US012572764B2

(12) United States Patent
Steinbauer et al.

(10) Patent No.: US 12,572,764 B2
(45) Date of Patent: Mar. 10, 2026

(54) APPARATUS AND METHOD FOR AEROSOL DELIVERY

(71) Applicant: SkyX IP Holdings I LLC, New York, NY (US)

(72) Inventors: Martin Steinbauer, New York, NY (US); Kylie Halperin, New York, NY (US); Maia Stoicovici, Queens, NY (US); Frederic Levy, Brooklyn, NY (US); Sylvere Azoulai, Mamaroneck, NY (US)

(73) Assignee: SkyX IP Holdings I LLC, New York, NY (US)

( * ) Notice: Subject to any disclaimer, the term of this patent is extended or adjusted under 35 U.S.C. 154(b) by 0 days.

(21) Appl. No.: 18/211,706

(22) Filed: Jun. 20, 2023

(65) Prior Publication Data

US 2024/0190641 A1 Jun. 13, 2024

Related U.S. Application Data

(60) Provisional application No. 63/407,859, filed on Sep. 19, 2022.

(51) Int. Cl.
*A24F 40/50* (2020.01)
*A24F 40/40* (2020.01)
(Continued)

(52) U.S. Cl.
CPC .......... *G06K 7/10297* (2013.01); *A24F 40/40* (2020.01); *A24F 40/42* (2020.01);
(Continued)

(58) Field of Classification Search
USPC ....................................................... 700/283
See application file for complete search history.

(56) References Cited

U.S. PATENT DOCUMENTS

| 10,959,459 B2 | 3/2021 | Sur |
| 11,510,040 B2 | 11/2022 | Kersey |

(Continued)

FOREIGN PATENT DOCUMENTS

WO 2022013086 A1 1/2022

OTHER PUBLICATIONS

Bilginer et al., "Near Field Communication" Master's Thesis, Lund University, Feb. 2011, 105 pgs., (Year: 2011).*

(Continued)

*Primary Examiner* — Emilio J Saavedra
(74) *Attorney, Agent, or Firm* — Caldwell Intellectual Property Law

(57) ABSTRACT

An apparatus for aerosol delivery, wherein the apparatus includes an outer body, a power source, an aerosolizable material reservoir, a control circuit containing an aerosol generation mechanism, and a processing circuit configured to send identification data associated with the apparatus to an external device, receive an external response from the external devices, wherein the external response is generated as a function of the identification data by the external device, modify an internal state of the processing circuit as a function of the external response, determine a device usability as a function of the modified internal state, and configure the control circuit as a function of the device usability.

20 Claims, 14 Drawing Sheets

(51) Int. Cl.

| | | |
|---|---|---|
| *A24F 40/42* | (2020.01) | |
| *A24F 40/65* | (2020.01) | |
| *B65D 83/72* | (2006.01) | |
| *G05B 15/02* | (2006.01) | |
| *G06K 7/10* | (2006.01) | |

(52) U.S. Cl.

CPC .............. *A24F 40/50* (2020.01); *A24F 40/65* (2020.01); *B65D 83/72* (2013.01); *G05B 15/02* (2013.01)

(56) References Cited

U.S. PATENT DOCUMENTS

| 2015/0327596 | A1 | 11/2015 | Alarcon et al. |
|---|---|---|---|
| 2017/0281883 | A1 | 10/2017 | Li et al. |
| 2019/0158938 | A1* | 5/2019 | Bowen .................... A24F 40/65 |
| 2019/0166913 | A1 | 6/2019 | Trzecieski |
| 2020/0138111 | A1* | 5/2020 | Angelico ................ A24F 40/53 |
| 2020/0195695 | A1* | 6/2020 | Dagdeviren .......... H04L 67/125 |
| 2020/0315253 | A1* | 10/2020 | Legendy ................ A24F 40/42 |
| 2021/0052003 | A1 | 2/2021 | Grimm et al. |
| 2021/0212379 | A1* | 7/2021 | Naeckel .................. A24F 40/57 |
| 2021/0219608 | A1* | 7/2021 | Carlberg ................ A24F 40/70 |
| 2021/0350374 | A1* | 11/2021 | Keen ..................... H04L 9/0866 |
| 2022/0095698 | A1* | 3/2022 | Talbot .................... H04L 67/34 |
| 2022/0279860 | A1 | 9/2022 | Stockall |
| 2022/0398602 | A1* | 12/2022 | Guo ........................ H04W 4/80 |
| 2022/0400775 | A1* | 12/2022 | Adair ..................... A24F 40/40 |
| 2023/0346019 | A1 | 11/2023 | Saygili |

| 2024/0090582 | A1 | 3/2024 | Steinbauer |
|---|---|---|---|
| 2024/0140685 | A1 | 5/2024 | Steinbauer |
| 2024/0190641 | A1 | 6/2024 | Steinbauer et al. |

OTHER PUBLICATIONS

Frenzel, "Welcome to Antennas 101" Electronic Design, Jul. 28, 2021, accessed at: https://www.electronicdesign.com/technologies/components/passives/article/21769333/electronic-design-welcome-to-antennas-101 (33 pg. Print Out) (Year: 2021).*

Rahul et al, "Near Field Communication (NFC) Technology: a Survey" International Journal on Cybernetics & Informatics (IJCI) vol. 4, No. 2, Apr. 2015, pp. 133-144 (Year: 2015).*

STMicroelectronics, "How to design an antenna for dynamic NFC tags" AN2972 Application Note, 26 Pgs., 2019 (Year: 2019).*

STMicroelectronics. How to design an antenna for dynamic NFC tags. Application Note AN2972, Rev 9, Mar. 2019. Available at: https://www.st.com/resource/en/application_note/an2972-how-to-design-an-antenna-for-dynamic-nfc-tags-stmicroelectronics.pdf.

Rahul, Anusha & Krishnan, Gokul & H, Unni & Rao, Sethuraman. (2015). Near Field Communication (NFC) Technology: a Survey. International Journal on Cybernetics & Informatics. 4. 133-144. 10.5121/ijci.2015.4213.

Frenzel, L. E. (Jul. 29, 2021). Welcome to Antennas 101. Electronic Design. https://www.electronicdesign.com/technologies/components/passives/article/21769333/electronic-design-welcome-to-antennas-101.

Bilginer, B., & Ljunggren, P.-L. (2011). Near Field Communication (Master's thesis). Lund University, Department of Measurement Technology and Industrial Electrical Engineering.

* cited by examiner

536

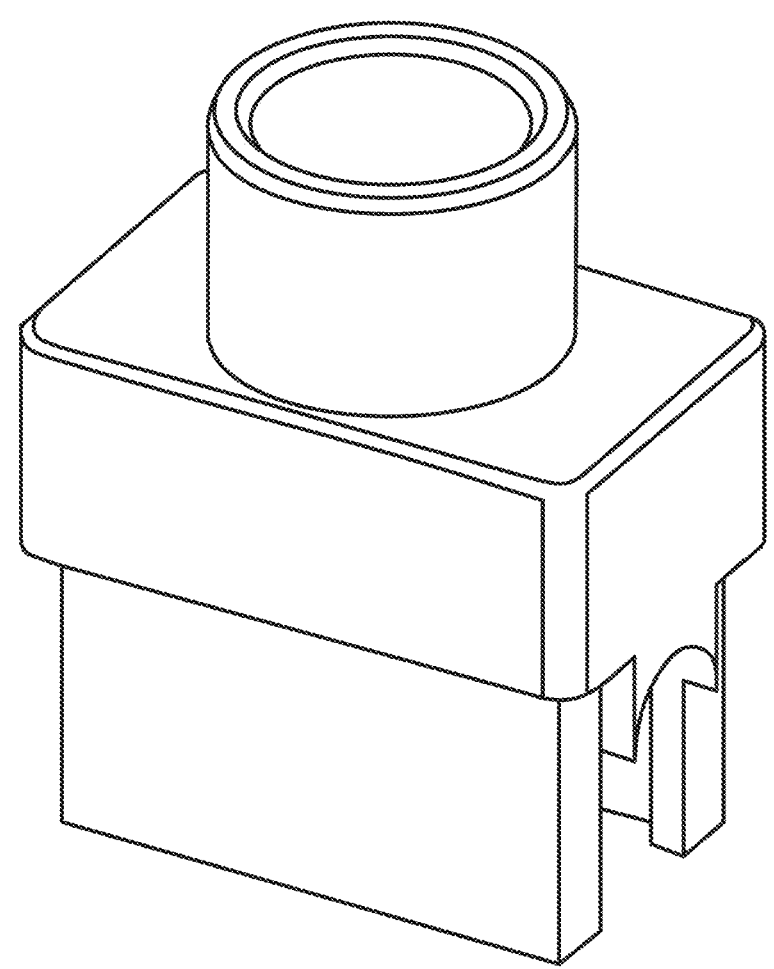
FIG. 5D

564

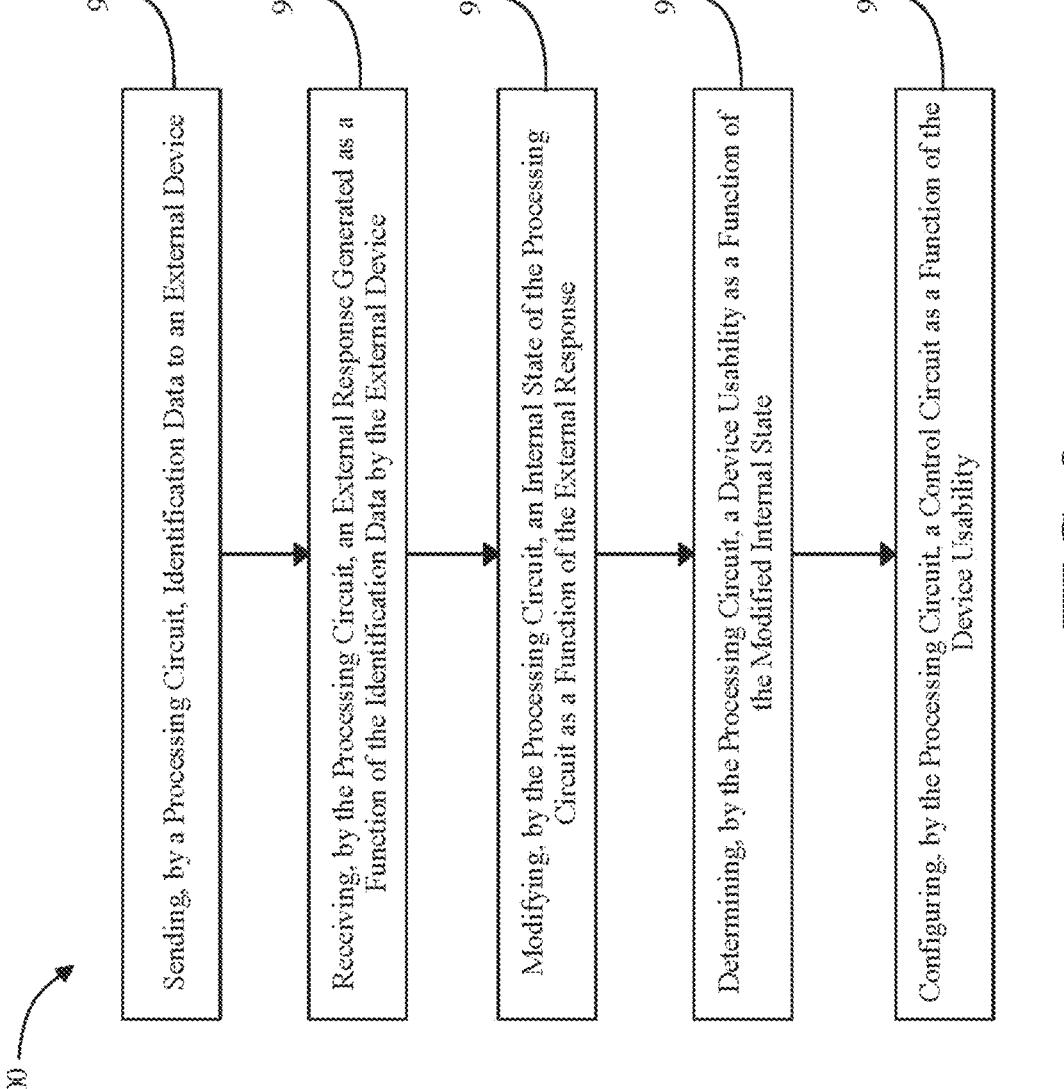

905 — Sending, by a Processing Circuit, Identification Data to an External Device 910 — Receiving, by the Processing Circuit, an External Response Generated as a Function of the Identification Data by the External Device 915 — Modifying, by the Processing Circuit, an Internal State of the Processing Circuit as a Function of the External Response 920 — Determining, by the Processing Circuit, a Device Usability as a Function of the Modified Internal State 925 — Configuring, by the Processing Circuit, a Control Circuit as a Function of the Device Usability

APPARATUS AND METHOD FOR AEROSOL DELIVERY

CROSS-REFERENCE TO RELATED APPLICATIONS

This application claims the benefit of priority of U.S. Provisional Patent Application Ser. No. 63/407,859, filed on Sep. 19, 2022 and titled "NFC-BASED CONTROL SYSTEM FOR AEROSOL DELIVERY DEVICES," which is incorporated by reference herein in its entirety.

FIELD OF THE INVENTION

The present invention generally relates to the field of aerosol delivery devices. In particular, the present invention is directed to an apparatus and method for aerosol delivery.

BACKGROUND

Aerosol delivery devices such as, without limitation, vaporizers, heat not burn devices, nebulizers, metered-dose inhalers, any other aerosol generation devices, and the like, have grown rapidly in the past few years. Aerosol delivery devices may be configured, customized, or otherwise controlled by a device user in a sophisticated manner; however, existing solutions may not provide any control to the manufacturers concerning their use.

SUMMARY OF THE DISCLOSURE

In an aspect, an apparatus for aerosol delivery is described. The apparatus includes an outer body, a power source, an aerosolizable material reservoir, a control circuit containing an aerosol generation mechanism, and a processing circuit configured to send identification data associated with the apparatus to an external device, receive an external response generated as a function of the identification data by the external device, modify an internal state of the processing circuit as a function of the external response, determine a device usability as a function of the modified internal state, and configure the control circuit as a function of the device usability.

In another aspect, a method for aerosol delivery is described. The method includes sending, by a processing circuit, identification data to an external device, receiving, by the processing circuit, an external response generated as a function of the identification data by the external device, modifying, by the processing circuit, an internal state of the processing circuit as a function of the external response, determining, by the processing circuit, a device usability as a function of the modified internal state, and configuring, by the processing circuit, a control circuit as a function of the device usability.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5A-E are exemplary embodiments of aerosol delivery device assemblies;

FIG. 9 is a flow diagram of an exemplary method for aerosol delivery; and

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for aerosol delivery. In an embodiment, the apparatus may include a near-field communication (NFC) enabled aerosolization device for both consumer and medical applications.

Aspects of the present disclosure can be used to perform age restriction on the use of the apparatus. Aspects of the present disclosure can also be used to enforce age verification at retail locations. This is so, at least in part, because the apparatus may include an NFC chip in communication with an external device to lock and unlock the apparatus. In some embodiments, the external device may include a remote server and an NFC reader communicatively connected to the remote server configured to transmit identification data to the remote server.

Aspects of the present disclosure allow for monitoring a sales location and patterns of the apparatus. Exemplary embodiments illustrating aspects of the present disclosure are described below in the context of several specific examples.

Figure 1:
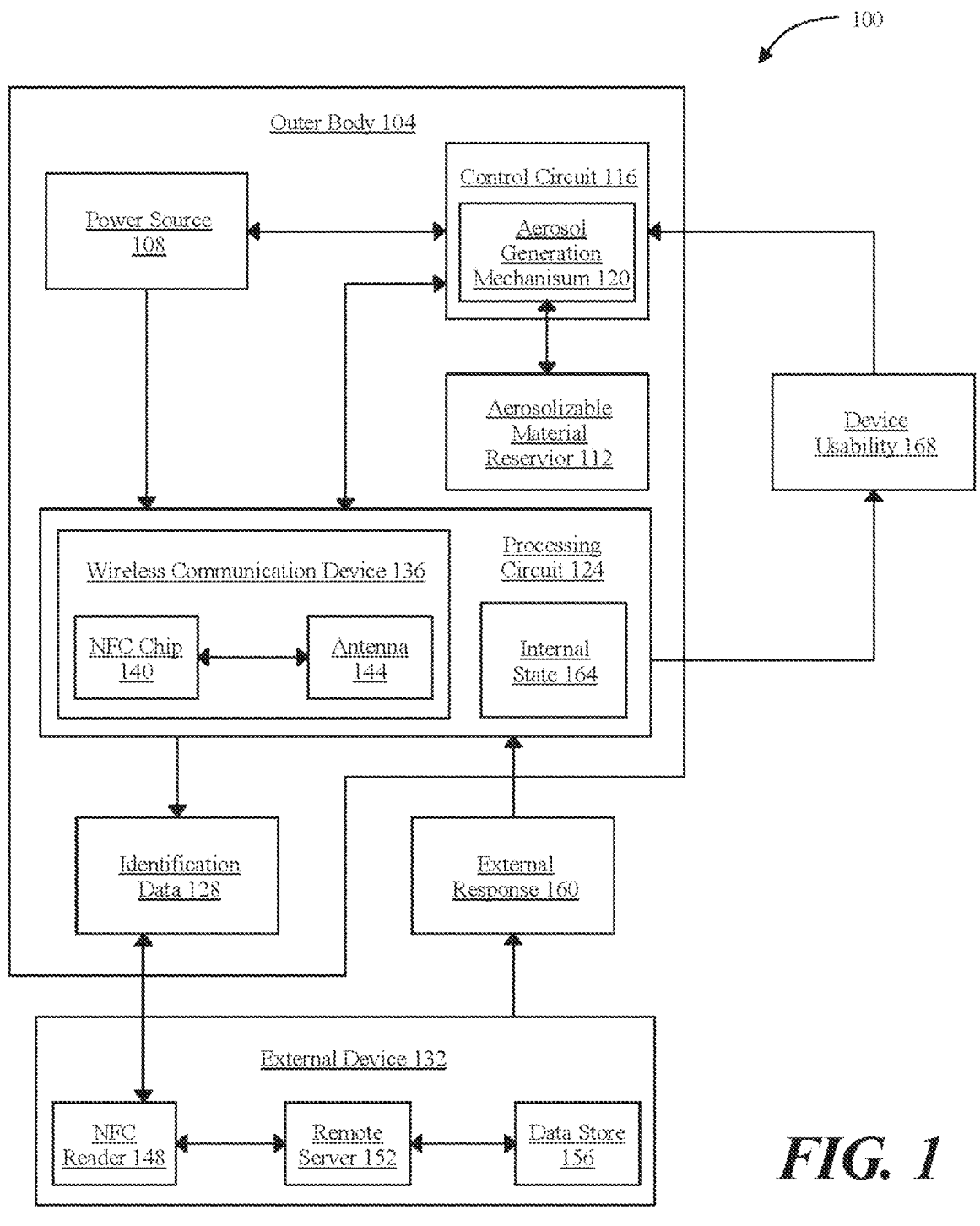
FIG. 1 is an exemplary embodiment of an apparatus for aerosol delivery.

Referring now to FIG. 1, an exemplary embodiment of an apparatus 100 for aerosol delivery is illustrated. Apparatus 100 includes an outer body 104. As used in this disclosure, an "outer body" is a container configured to encapsulate a plurality of internal elements of apparatus 100 such as, without limitation, any elements, components, and/or devices except for external device described below in this disclosure. Outer body 104 may be constructed of any suitable material or combination of materials. For instance, and without limitation, outer body 104 may be constructed at least in part of metal, such as without limitation aluminum, steel, or the like. Outer body 104 may be constructed at least in part of plastic, such as without limitation polyvinyl chloride (PVC), high-density polyethylene (HDPE), acrylonitrile butadiene styrene (ABS), or the like. Outer body 104 may be composed at least in part of ceramic. Outer body 104 may be composed at least in part of composite material; as a non-limiting example, outer body 104 may be composed at least in part of fiberglass or hemp fiber. Outer body 104 may be manufactured according to any suitable method or combination of methods, including without limitation casting molding, subtractive processes such as machining, computer numerical control (CNC) machining or the like, additive processes such as fused deposition printing, power-binder printing, selective laser sintering, stereolithography, or the like, lamination, coating, finishing, painting, polishing engraving, anodization, assembly of parts through adhesion, engineering fits, fastening, fusing or the like, or any combination thereof. Persons skilled in the art, upon reviewing the entirety of this disclosure, will be aware of various materials and/or material components usable to construct outer body 104 or other elements, components, and/or devices of apparatus 100, as well as suitable methods or combinations of methods for manufacturing outer body 104, components of outer body 104, and/or any other elements, components, and/or devices of apparatus 100 as consistent with the instant disclosure. Outer body 104 may be described in further detail below in reference to FIG. 4.

With continued reference to FIG. 1, apparatus 100 includes a power source 108. As used in this disclosure, a "power source" is an element configured to provide electric power to a circuit or device. In some cases, power source 108 may be connected to a plurality of electronic device or components such as, without limitation, processing circuit, control circuit, and/or any computing device described below in this disclosure, and the like thereof. Power source 108 may include, without limitation, a battery containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; a power source may be rechargeable. In some embodiments, power source 108 may be further configured to transmit electric power to elements, components, and/or devices within apparatus 100 which requires electricity to operate, such as, without limitation, processing circuit, control circuit, and/or any computing device described in this disclosure, and the like thereof. In some cases, transmitting electric power may include using one or more continuous conductor. As used in this disclosure, a "continuous conductor" is an electrical conductor, without any interruption, made from electrically conducting material that is capable of carrying electrical current. Electrically conductive material may comprise copper for example. Electrically conductive material may include any material that is conductive to electrical current and may include, as a nonlimiting example, various metals such as copper, steel, or aluminum, carbon conducting materials, or any other suitable conductive material. In a non-limiting example, power source 108 may transmit electric power through a continuous conductive wire to control circuit and/or processing circuit. Additionally, or alternatively, power source 108 may be integrated and/or embedded within control circuit and/or processing circuit. In a non-limiting example, control circuit and/or processing circuit may be supplied by separate power sources. In other embodiments, control circuit and/or processing circuit may share a common power source 108. In a non-limiting example, a power source 108 may be remote to control circuit and/or processing circuit and transmit electric power through one or more continuous conductor to control circuit and/or processing circuit over a distance within apparatus 100.

With continued reference to FIG. 1, apparatus 100 includes an aerosolizable material reservoir 112. As used in this disclosure, an "aerosolizable material reservoir" is a component of apparatus 100 configured to hold an aerosolizable material. "Aerosolizable material," for the purpose of this disclosure, is a material that is capable for aerosolization, wherein the aerosolization is a process of intentionally oxidatively converting and suspending particles or a composition in a moving stream of air. Aerosolizable material may include one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends. Chemicals may be in pure form and/or in combination or mixture with humectants that may or may not be mixed with plant material. In a non-limiting example, aerosolizable material may include E-cigarette liquid, wherein the E-cigarette liquid is a liquid solution or mixture used in aerosol delivery device such as, without limitation, an e-cigarette. In some cases, aerosolizable material may include a humectant, wherein the "humectant" may generally refer to as a substance that is used to keep things moist. Humectant may attract and retain moisture in the air by absorption, allowing the water to be used by other substances. Humectants are also commonly used in many tobaccos or botanicals and electronic vaporization products to keep products moist and as vapor-forming medium. Examples may include, without limitation, propylene glycol, sugar polyols such as glycerol, glycerin, honey and the like thereof. Continuing the non-limiting example, E-cigarette liquid may consist a combination of propyleneglycol and glycerin (95%), and flavorings, nicotine, and other additives (5%). In some embodiments, aerosolizable material held by aerosolizable material reservoir 112 may be replaceable. In a non-limiting example, aerosolizable material reservoir may include a secondary container such as a liquid chamber, wherein the liquid chamber may contain a single type of aerosolizable material. Liquid chamber may be inserted into aerosolizable material reservoir; in other words, aerosolizable material may not be indirect contact with aerosolizable material reservoir. User of apparatus 100 may switch from a first aerosolizable material to a second aerosolizable material by ejecting a first liquid chamber storing the first aerosolizable material from aerosolizable material reservoir 112 and inserting a second liquid chamber storing the second aerosolizable material into aerosolizable material reservoir 112.

With continued reference to FIG. 1, apparatus 100 includes a control circuit 116. As used in this disclosure, a "control circuit" is a circuit configured to detect or otherwise control a status of one or more elements, components, and/or devices within apparatus 100. Control circuit may be implemented, without limitation, as an application-specific integrated circuit (ASIC), a reconfigurable hardware circuit such as a field-programmable gate array (FPGA), as a microprocessor, microcontroller, an analog circuit such as without limitation an operational amplifier circuit, or as any other circuit capable of generating signals as described in further detail below. In some embodiments, without limitation, control circuit 108 may be further configured to control other elements, components, and/or devices within apparatus 100. Control circuit 116 of apparatus 100 includes an aerosol generation mechanism 120. For instance, and without limitation, control circuit 116 may be configured to direct, control, or otherwise regulate the output of electric power from power source 108 through continuous conductor to other components of apparatus 100 that require electric power input such as, without limitation, aerosol generation mechanism 120.

With continued reference to FIG. 1, as used in this disclosure, an "aerosol generation mechanism" is a component of apparatus 100 configured to generate aerosol using an aerosolizable material. In an embodiment, aerosol generation mechanism may be configured to convert any aerosolizable material into a vapor. "Vapor," for the purpose of this disclosure, refers to a substance that is in a gas phase at a temperature lower than its critical point. The vapor may be condensed to a liquid or to a solid by increasing its pressure without reducing the temperature. Vapor may include an aerosol, where "aerosol" may generally refer to a colloid of fine solid particles or liquid droplets in air or another gas. Examples of aerosols may include clouds, haze, and smoke, including the smoke from tobacco or botanical products. The liquid or solid particles in an aerosol may have varying diameters of average mass that may range from monodisperse aerosols, producible in the laboratory, and containing particles of uniform size; to polydisperse colloidal systems, exhibiting a range of particle sizes. As the sizes of these particles become larger, they have a greater settling speed which causes them to settle out of the aerosol faster, making the appearance of the aerosol less dense and to shorten the time in which the aerosol will linger in air. Interestingly, an aerosol with smaller particles will appear thicker or denser because it has more particles. Particle number has a much bigger impact on light scattering than particle size (at least for the considered ranges of particle size), thus allowing for a vapor cloud with more smaller particles to appear denser than a cloud having fewer, but larger particle sizes.

With continued reference to FIG. 1, in some embodiments aerosol generation mechanism 120 may include various internal elements, including without limitation, a heating element, which may include a resistive heater configured to thermally contact the aerosolizable material from aerosolizable material reservoir 112. Power source 108 controlled by control circuit 116, as described above, may provide electricity to heating element. In a non-limiting example, using heating element of aerosol generation mechanism 120 for vaporization of aerosolizable material may be used as an alternative to burning (smoking) which may avoid inhalation of many irritating and/or toxic carcinogenic by-products which may result from pyrolytic processes of burning material such as, without limitation, tobacco or botanical products above 300 degrees C. Heating element may operate at a temperature at/or below 300 degrees C., configured by aerosol generation mechanism 120, controlled by control circuit 116.

In a non-limiting example, and still referring to FIG. 1, aerosol generation mechanism 120 may include an atomizer and/or cartomizer configured to heat aerosolizable material. As used in this disclosure, an "atomizer" is a device for emitting liquid, such as aerosolizable material, as a fine spray such as, without limitation, a vapor. Aerosolizable material may include any aerosolizable material described above in this disclosure; for instance, and without limitation, aerosolizable material may comprise glycerin and/or propylene glycol. The aerosolizable material may be heated, by heating element described above, to a sufficient temperature such that it may vaporize. Atomizer may be a device or system configured to generate an aerosol. An atomizer may include, without limitation, a small heating element that heats and/or vaporizes at least a portion of aerosolizable material and a wicking material that may draw a liquid aerosolizable material in to the atomizer; a wicking material may comprise silica fibers, cotton, ceramic, hemp, stainless steel mesh, and/or rope cables. A wicking material may be designed and/or configured to draw liquid aerosolizable material into atomizer without a pump or other mechanical moving part. A resistance wire may be wrapped around a wicking material and then connected to a positive and negative pole of a current source such as a power source as noted above; a resistance wire may include, without limitation, a coil, and when activated may have a temperature increase as a result of the current flowing through the resistive wire to generate heat. Heat may be transferred from heating element to aerosolizable material through conductive, convective, and/or radiative heat transfer such that aerosolizable material vaporizes.

In another non-limiting example, and further referring to FIG. 1, as an alternative or additional element to the atomizer, aerosol generation mechanism 120 may include a "cartomizer" to generate aerosol from the aerosolizable material for inhalation by the user of apparatus 100. As used in this disclosure, a "cartomizer" is a combination of a cartridge and atomizer as described above, wherein the cartridge is a component that holds aerosolizable material. As a non-limiting example, cartridge may include aerosolizable material reservoir 112. A cartomizer may include a heating element surrounded by a liquid-soaked poly-foam that acts as holder for aerosolizable material, which may include without limitation a liquid. In some embodiments, aerosol generation mechanism 120 may not have an atomizer or cartomizer, but may include an oven instead, which may be at least partially closed. An "oven," for the purpose of this disclosure, is a component configured to heat confined substances, such as, without limitation, aerosolizable material. Oven may have a closable opening. Oven may be wrapped with heating element or may be in thermal communication with a heating element by means of another mechanism. Aerosolizable material may be placed directly in an oven or in a liquid chamber fitted in the oven. A heating element in thermal communication with the oven may heat aerosolizable material mass in order to create a gas phase vapor, including without limitation through conductive, convective, and/or radiative heat transfer. Vapor may be released to a vaporization chamber where gas phase vapor may condense, forming an aerosol cloud having typical liquid vapor particles with particles having a diameter of average mass of approximately 1 micron or greater. In some cases, the diameter of average mass may be approximately 0.1-1 micron.

With continued reference to FIG. 1, air may be drawn into aerosol generation mechanism 120 to carry the vaporized aerosol away from heating element, where it then cools and condenses to form liquid particles suspended in air, which may then be drawn out of a mouthpiece by the user. Mouthpiece may be described in further detail below with reference to FIG. 4. In a non-limiting example, apparatus may include an air hole, wherein the air hole is a hole or passage that allows air to pass through apparatus 100. In an embodiments, fresh air may be allowed to enter apparatus 100 when the heating element is on. Vaporization of aerosolizable material may occur at lower temperatures in aerosol generation mechanism 120 compared to temperatures required to generate an inhalable vapor in an actual cigarette. Actual cigarette may be a device in which a smokable material is burned to generate an inhalable vapor. The lower temperature of aerosol generation mechanism 120 may result in less decomposition and/or reaction of aerosolizable material, and therefore produce an aerosol with many fewer chemical components compared to actual cigarette. In some cases, aerosol generation mechanism 120 may generate aerosol with fewer chemical components that may be harmful to human health compared to actual cigarette.

With continued reference to FIG. 1, apparatus 100 includes a processing circuit 124. As used in this disclosure, a "processing circuit" is a circuit configured to perform processing and/or memory functions. In a non-limiting example, processing circuit 124 may be configured to process any processing steps described in this disclosure. Processing circuit 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processing circuit 124 may include a single computing device operating independently, or may include two or more computing device operating in concert, in parallel, sequentially or the like; two or more computing devices may be included together in a single computing device or in two or more computing devices. Processing circuit 124 may interface or communicate with one or more additional devices as described below in further detail via a network interface device. Network interface device may be utilized for connecting processing circuit 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processing circuit 124 may include but is not limited to, for example, a computing device or cluster of computing devices in a first location and a second computing device or cluster of computing devices in a second location. Processing circuit 124 may include one or more computing devices dedicated to data storage, security, distribution of traffic for load balancing, and the like. Processing circuit 124 may distribute one or more computing tasks as described below across a plurality of computing devices of computing device, which may operate in parallel, in series, redundantly, or in any other manner used for distribution of tasks or memory between computing devices. Processing circuit 124 may be implemented using a "shared nothing" architecture in which data is cached at the worker, in an embodiment, this may enable scalability of apparatus 100 and/or computing device.

With continued reference to FIG. 1, processing circuit 124 may be designed and/or configured to perform any method, method step, or sequence of method steps in any embodiment described in this disclosure, in any order and with any degree of repetition. For instance, processing circuit 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing circuit 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in some embodiments, processing circuit 124 is configured to send identification data 128 associated with apparatus 100 to an external device 132. As used in this disclosure, "identification data" is data that uniquely identifies apparatus 100 and/or a user of apparatus 100. In a non-limiting example, a first aerosol delivery device may include first identification data associated therewith and a second aerosol delivery device may include second identification data associated therewith, wherein at least a portion of first identification data may be different than at least a portion of second identification data, although both the first aerosol delivery device and the second aerosol delivery device may be manufactured by a same manufacturer. In some embodiments, identification data 128 may include, without limitation, production timestamp, production line serial number, device serial number, device ID, batch number, and the like thereof. In other embodiments, identification data 128 may include user metadata. As used in this disclosure, "user metadata" is data that provides information about user of apparatus 100. In some cases, user may include a buyer of apparatus 100 who purchase apparatus 100 from a retailer. In other cases, user may include retailer who stocks apparatus 100 from a supplier (such as a vendor). In some embodiments, user metadata may be received, collected, or otherwise gather, by processing circuit 124, from the user at the time of purchasing User metadata may include, without limitation, purchase timestamp, name, address, email address, date of birth, user identification, and the like thereof. In a non-limiting example, user metadata within identification data associated with apparatus 100 may be generated, by processing circuit 124, as a function of the transaction; for instance, and without limitation, user metadata may be collected from payment and/or ID verification during the transaction. Additionally, or alternatively, identification data may be encrypted, by processing circuit 124, in one or more ways described above in reference to the cryptographic system. In a non-limiting example, processing circuit 124 may encrypt identification data 128 into one or more hashes through hash functions as described above.

With continued reference to FIG. 1, additionally, or alternatively, processing circuit 124 may be configured to send usage data associated with apparatus 100 to external device 132. As used in this disclosure, "usage data" refers to information related how apparatus 100 is used by the user. In an embodiment, usage data may be used to provide insights into user behavior. In a non-limiting example, usage data may include a puff count, wherein the puff count may indicate number of times the user takes a puff (i.e., user inhalation) from apparatus 100. In some cases, puff count may be used to estimate how much aerosolizable material (i.e., e-liquid) is consumed by the user and to track usage of apparatus 100 over time. In a non-limiting example, puff count may be used to determine a quantity of active ingredient inhaled by the user. In another non-limiting example, usage data may include a battery usage, wherein the battery usage may indicate how much battery (i.e., power source) power is consumed by apparatus 100. In a further non-limiting example, a use duration may also be recorded by apparatus 100, wherein the use duration may indicate the length of time that the user spends using apparatus 100. Usage data may be collected by processing circuit; for instance, and without limitation, processing circuit 124 may be programed to count how long and at what interval or time the battery is activated via an automated tracker, instead of user self-reporting usage or camera filming the user. Automated tracker (e.g., puff counter, battery monitor, temperature sensor, motion sensor, and/or the like) may be integrated on a printed circuit board assembly (PCBA) as described below in further detail. As such, duration of each inhalation session, and also the total duration may be calculated and/or recorded (e.g., usage 1, 3 seconds, usage 2, 3.5 seconds, . . . , usage N, 3 seconds) by processing circuit 124. In some cases, total duration may be calculated without a timestamp; for instance, and without limitation, processing circuit 124 may record at $T_0$, wherein $T_0$ may be a first inhalation session, upon unlock apparatus 100 through external device as described below, or at a preprogrammed time running on UTC.

With continued reference to FIG. 1, in some embodiments, processing circuit 124 may include a wireless communication device 136 configured to communicate with external device 132. As used in this disclosure, a "wireless communication device" is a device that is capable of communicating with other devices without a physical and electrical connection. Communication may include, without limitation, data transfer, signal transmission, and the like thereof. In some embodiments, wireless communication device 136 may be configured to communicate with external device 132 within a communication network. Communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wireless mode of communication. Additionally, or alternatively, wireless communication device 136 may use radio frequency identification (RFID) to communicate with external device 132, wherein the RFID is a form of wireless communication that incorporates the use of electromagnetic or electrostatic coupling in the radio frequency portion of the electromagnetic spectrum to uniquely identify an object such as, without limitation, apparatus 100. In some embodiments, wireless communication device 136 using RFID may include a transponder, wherein the transponder is a component that configured to respond to different incoming signals. Further wireless communication device using RFID may be operate under different frequency; for instance, wireless communication device may operate at various frequency including, without limitation, low frequency (30 KHz to 500 KHz), high frequency (3 MHz to 30 MHz), Ultra high frequency (300 MHz to 960 MHz), and the like thereof.

With continued reference to FIG. 1, in other embodiments, wireless communication device 136 may include a near field communication (NFC) chip 140. As used in this disclosure, a "near field communication chip" is a component that enables processing circuit 124 to communicate with other devices such as external device 132 wirelessly, within a short range using near-field communication technology, wherein the near-field communication technology may enable NFC chip to execute a plurality of communication protocols that enables communication between two devices, such as, without limitation, wireless communication device 136 to external device 132, over a distance of 4 cm (1.5 inches) or less. NFC chip 140 may offer a low-speed connection used to bootstrap one or more wireless connection similar to proximity card technology; for instance, and without limitation, NFC chip 140 may function as a smart card. Additionally, or alternatively, NFC chip 140 may further includes an antenna 144 communicatively connects to it. As used in this disclosure, an "antenna" is a device configured to convert voltage from a transmitter into a radio signal. Antenna 144 may pick radio signals out of the air and convert them into voltage for recovery in a receiver. In an embodiment, antenna may include a transducer. In some cases, a plurality of antennas may be connected to NFC chip 140. In a non-limiting example, wireless communication device 136 with NFC chip 140 connecting to two antennas may communicate with external device 132 in both directions using a frequency of 13.56 MHZ in globally available unlicensed radio frequency ISM band using ISO/IEC 18000-3 air interface standard at data rates ranging from 106 to 424 kbit/s. Further, NFC chip 140 may be disposed within outer body 104; for instance, and without limitation, on the cartridge as described in further detail below in reference to FIG. 4. In other cases, NFC chip 140 may be disposed externally to outer body 104. In such embodiment, NFC chip 140 may include a NFC sticker that adheres to the exterior of outer body 104.

Still referring to FIG. 1, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Further referring to FIG. 1, in some cases, processing circuit 124 may perform one or more signal processing stepson a signal. For instance, processing circuit 124 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in some embodiments, identification data 128 may include a unique identifier (ID) associated with NFC chip 140. As used in this disclosure, a "unique identifier" is an element of data that uniquely identifies wireless communication device 136 and/ or NFC chip 140. In an embodiments, unique identifier may include a sequence of numbers. In another embodiments, unique identifier may include a combination of numbers, letters, and/or characters. In some embodiments, unique identifier may be generated, by processing circuit 124, external device 132, and/or any other computing device, during production. In a non-limiting example, after quality control and puff sensor machine testing during production, external device 132 may generate and/or assign a unique ID to apparatus 100 through NFC chip 140 that in communication with external device 132. Unique ID may be encoded on the NFC chip and/or stored in external device 132 as described in further detail below. In some embodiments, communication between wireless communication device 136 and external device 132 may be in real-time as communicated through communication network described above. In a non-limiting example, processing circuit 124 may be configured to send identification data, such as, without limitation, unique ID, user metadata, and the like to external device 132 through wireless communicating device 136 using NFC chip 140 to external device 132. Such communication may be triggered when NFC chip 140 is detected within the specified range by external device 132 as described in further detail below. Additionally, or alternatively, transmitting unique ID associated with NFC chip 140 may provide manufacturing businesses quality control, especially in complex electric, mechanical, and chemical systems such as vaporizers or other aerosol generating devices for quality assurance during manufacturing and/or selling products. Aerosol delivery device with NFC enabled, such as, without limitation, apparatus 100 with unique ID may allow the manufacturer to identify and isolate any affected batches during and/or after manufacturing. This could assist in recalls or in alerts to retailers not to sell products within affected batches. Further, by transmitting unique ID associated with NFC chip 140 for each device purchased, retailers and the brand may track inventory and rate of sales to ensure stocking issues are avoided.

With continued reference to FIG. 1, as used in this disclosure, an "external device" is any device exterior to apparatus 100 that communicates with elements within apparatus 100. In some embodiments, external device 132 may include a user device. A "user device," for the purpose of this disclosure, is any additional computing device, such as a mobile device, laptop, desktop computer, or the like. In anon-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may includea- graphicaluserinterface (GUI) configuredtodisplayanyinfor- mationfrom apparatus 100, any computing device, and/or decentralized platform 108. In a non-limiting example, external device may include a transceiver, wherein the transceiver is a component (a combination of transmitter and/or receiver in a single package) configured to transmit, as well as receive, different signals as described above. In a non-limiting example, communication between wireless communication device 136 and external device 132 may include the use of Bluetooth Low Energy (Bluetooth LE, colloquially BLE) as a wireless personal area network technology. Such technologies may be combined with the NFC-enabled technology to provide data gathering and user setting optimization with end-user having the ability to control settings and systems of devices such as, without limitation, control circuit 116, processing circuit 124, and the like within apparatus 100 via a software application (i.e., computer program): for instance, and without limitation, an app, including a plurality of customizable settings of apparatus 100.

With continued reference to FIG. 1, in some embodiments, external device 132 may include an NFC reader 148. As used in this disclosure, an "NFC reader" is an external device configured to communicate with NFC chip 140 as described above. NFC reader 148 may support a plurality of radio-frequency (RF) protocols such as, without limitation, Zigbee, Bluetooth Low Energy, Wi-Fi, and the like thereof. In some embodiments, NFC reader 148 may initiate the communication; for instance, and without limitation, NFC reader may send one or more commands to NFC chip 140 within a distance via magnetic field such as, without limitation, command configuring processing circuit 124 to send identification data 128, and/or any processing steps described below in this disclosure. In some embodiments, NFC reader 148 may be capable of writing data into NFC chip 140. In a non-limiting example, NFC reader 148 may be used to write generated unique ID into NFC chip 140. At the point of sale, a reader provided to authorized retailers can unlock the device by placing the device near the reader if age verification was performed. As part of age verification, NFC reader 148 may save the ID of the device and send the ID to the internal company server. First, this allows for age verification at the point of sale to be enforced as a company policy. Secondly, this allows for traceability in the supply chain and counterfeit prevention. More importantly, it allows devices that were sold to minors to be traced back to the retail location and the time of purchase. If this is a consistent pattern of underage usage, this data can be used by the retailer, the company, or the Food and Drug Administration (FDA) to determine if a systemic underage sale problem exists and what action steps are best taken. Additionally, or alternatively, NFC reader may be integrated into user device as described above. In a non-limiting example, NFC reader may be a phone NFC reader embedded within user's mobile device. Such NFC reader may be implemented using a web NFC application programming interface (API) such as, without limitation, NDEFReader interface, wherein the web NFC API is a low-level API that provides sites/apps the ability to read and write to wireless communication device 136 containing NFC chip 140. In such embodiment, user may be able to verify, and/or lock/unlock apparatus 100 autonomously (instead of using the NFC reader at retail store) any time and/or anywhere. Methods of verifying and locking/unlocking are described in further detail below in this disclosure.

Still referring to FIG. 1, NFC reader 148 may be also configured to read usage data of apparatus 100 by communicating with NFC chip 140. In an embodiment, when the apparatus 100 is brought into close proximity with NFC reader 148, NFC chip 140 may send usage data to NFC reader 148 via a wireless signal. NFC reader 148 may process usage data using any computing device within, or communicatively connected to NFC reader 148 such as, without limitation, a remote server as described below. In a non-limiting example, in the case of a reward program, the user may be incentivized to tap apparatus 100 on NFC reader 148 for are cycling reward, providing usage data in a seamless fashion. In another non-limiting example, process of usage data may be used in running a clinical study measuring the actual use of apparatus 100. In other cases, a Bluetooth Low Energy (BLE) with/without MCU may be activated after scanning NFC chip 140 with NFC reader 148, to transmit usage data.

Additionally, or alternatively, NFC reader 148 may be communicatively connected to a remote server 152. As used in this disclosure, a "remote server" is a piece of computer hardware or software (i.e., computer program) that provides functionality for other programs or devices (known as clients). Remote server 152 may provide various functionalities such as sharing data or resources and performing computation among multiple other programs and or devices. Remote servers may include database servers, file servers, mail servers, print servers, web servers, and/or application servers. In an embodiment, remote server 152 may communicate with NFC reader 148 and/or any computing device described in this disclosure through a communication network described above. In a non-limiting example, NFC reader 148 may include a SIM card and is connected to the internet. NFC reader 148 may be configured to transmit received identification data 128 to remote server 152. NFC reader 148 may send a web request to remote server 152, wherein the web request is a type of communication protocol for data transmission made by a client, such as, without limitation, NFC reader 148. Communication protocol may include, but is not limited to, internet protocol (IP), transmission control protocol (TCP), inter-access point protocol, address resolution protocol (ARP), dynamic host configuration protocol (DHCP), file transfer protocol (FTP), internet control message protocol (ICMP), and the like thereof.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, external device 132 may be configured to store identification data 128, such as, without limitation, user metadata, unique identifier, and the like to a data store 156. In some cases, external device 132 may also be configured to store usage data of apparatus 100. In an embodiment, data store 156 may include a database. In some embodiments, a "data store" may be referred to as a "database." Data store 156 may be implemented, without limitation, as a relational database, a key-value retrieval database such as a NOSQL database, or any other format or structure for use as a database that a person skilled in the art would recognize as suitable upon review of the entirety of this disclosure. Data store 156 may alternatively or additionally be implemented using a distributed data storage protocol and/or data structure, such as a distributed hash table or the like. Data store 156 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure. In a non-limiting example, NFC reader 148 may transfer received identification data 128 along with a data received timestamp (i.e., timestamp of when the user purchase apparatus 100) to remote server 152. Remote server 152 may then store identification data 128 and the data received timestamp to data store 156.

With continued reference to FIG. 1, external device 132 may be further configured to post identification data 128, such as, without limitation, user metadata, unique identifier, and the like to an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In a non-limiting example, remote server 152 may generate a data entry on a decentralized platform, wherein the block may be configured to store unique ID associated with NFC chip 140. A "decentralized platform," as described herein, is a platform or server that enables secure data exchange between anonymous parties. Decentralized platform may be supported by any blockchain technologies. For example, and without limitation, blockchain-supported technologies can potentially facilitate decentralized coordination and alignment of human incentives on a scale that only top-down, command-and-control structures previously could. Decentralized platform may serve as an ecosystem for decentralized architectures such as immutable sequential listing and/or blockchain. In a non-limiting example, remote server 152 may generate a block configured to store unique ID associated with NFC chip 140 and post the block to immutable sequential listing. Unique ID associated with NFC chip 140 stored in the block may be retrieved, by remote server 152 and/or any other computing device, from immutable sequential listing; however, remote server 152 and/or any other computing device may not change, modify, or otherwise update unique ID associated with NFC chip 140 in any way.

With continued reference to FIG. 1, In some embodiments, communication between wireless communication device 136 and external device 132 may be configured to provide real-time end-to-end tracking of products from manufacturing to point of sale of apparatus 100, thereby providing an authentication and tracing mechanism. Additionally, or alternatively, automated supply chain tracking through point-of-sale identification data 128 transmission may be provided to manufacturers of apparatus 100 in order for them to track sales, predict restocking needs of retailers, and anticipate manufacturing volume of such products with the disclosed apparatus 100 and method. Implementation of NFC technology described in this disclosure may have an advantage in that it provides a low-cost solution to boost sales and increase profitability. In a non-limiting example, for both consumer and medical applications, aerosol delivery device with an NFC-enabled, such as, without limitation, apparatus 100, may be configured to 1). trace products in the supply chain, allowing an integrated method of complying with strict medical device supply chain guidelines or regulatory requirements for tracing age-restricted products; 2). verify authenticity of product vis-a-vis counterfeits; 3). monitor sales locations and sales behaviors; 4). assist in re-stocking of product at retail; and/or 5). provide data for consumer/patient behavior. In some embodiments, identification data 128 stored and tracked by remote server 152 may be used for identification of the source and the likelihood of a batch containing faulty devices. In this case, identification data 128 may help link batch, processing, and manufacturing data for future optimization.

With continued reference to FIG. 1, processing circuit 124 is configured to receive an external response 160 from external device 132. As used in this disclosure, an "external response" is a signal received from remote server 152 and/or any computing device in wireless communication with wireless communication device 136 as a response to identification data. External response 160 is generated, by external device 132, as a function of identification data 128. In some embodiments, external response 160 may be generated as a function of a request from wireless communication device 136, such as, without limitation, request for identification data verification. External response 160 may be generated by one or more web APIs. For instance, and without limitation, remote server 152 may include one or more APIs configured to process, analyze, and/or verify identification data 128. In an embodiment, generating external response 160 may include comparing, by remote server 152, identification data 128 with a historical identification data, wherein the historical identification data are pre-saved identification data of apparatus 100 at the point of manufacture. Both historical identification data and identification data 128 may reference the same device. Historical identification data may be stored and/or retrieved from data store 156. For example, and without limitation, unique ID associated with NFC chip 140 may be stored in data store 156 when NFC chip 140 is connected to processing circuit 124 during manufacturing. Remote server 152 may generate external response 160 as a function of the comparison; for instance, and without limitation, if there is historical identification data that matches with identification data 128, remote server 152 may generate an external response containing instructions to unlock apparatus 100, otherwise, remote server 152 may generate an external response containing instructions to lock apparatus 100. In some embodiments, apparatus 100 may be configured to perform age restriction on the use of the device. Aerosol Delivery Devices, including but not limited to vaporizers, heat not burn, nebulizers, metered-dose inhalers, along with other aerosol generating products may require a robust method for age-verification of age restricted products at the point of sale, including enforcement of age verification in many retail locations without reliance on store clerks to enforce checking of IDs. Additionally, the disclosed embodiments provide manufacturers the ability to regulate the sale of nicotine to minors in retail locations such as convenience stores. Additionally, or alternatively, in the scenario where the device delivers prescribed medications such as controlled substances, disclosed embodiments may also serves as an enforcement method to perform "identity verification" of the patient at a pharmacy or anywhere else. In another embodiment, the disclosed embodiments may be configured to track the origin of the aerosol generating device to the point of sale or otherwise investigate how a device was obtained, for regulatory, legal reasons, or otherwise.

With continued reference to FIG. 1, as used in this disclosure, "verification" is a process of ensuring that which is being "verified" complies with certain constraints, for example without limitation system requirements, regulations, and the like. In some cases, verification may include comparing a product, such as without limitation identification data 128, against one or more acceptance criteria. For example, in some cases, identification data 128 may be required to contain user metadata specifying user's age is over 21. Ensuring that identification data 128 is in compliance with acceptance criteria may, in some cases, constitute verification. In some cases, verification may include ensuring that data is complete, for example that all required data types, are present, readable, uncorrupted, and/or otherwise useful for processing circuit 124. In some cases, some or all verification processes may be performed by remote server 152. Additionally, or alternatively, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation identification data 128 against a specification. In some cases, remote server 152 may be additionally configured to validate a product by validating constituent sub-products. In some embodiments, remote server 152 may be configured to validate any product or data, for example without limitation identification data 128. In a non-limiting example, validating identification data 128 such as, without limitation, unique ID associated with NFC chip 140, may include iterating by remote server 152, immutable sequence listing containing a plurality of unique IDs as described above. Unique ID may be valid if remote server 152 successfully locate and/or retrieve a same unique ID on immutable sequential listing. On the other hand, unique ID may be invalid if remote server 152 failed to locate and/or retrieve same unique ID on immutable sequential listing.

In a non-limiting example, and further referring to FIG. 1, external response 160 may include an HTTP transaction message, wherein the HTTP transaction message may include, without limitation, transaction status (e.g., 200, 400, 404, 500, and the like), response headers, response body, and the like thereof. External device 132 may include an ID reader; for instance, and without limitation, external device 132 may be configured to verify user identification data (i.e., name, date of birth, ID number, and the like) read from ID reader. External device, such as, without limitation, remote server 152 may include an API configured to perform user identification data verification, wherein the API may be configured to take user identification data such as, without limitation, user metadata, unique ID, and the like as input. Remote server 152 may be configured to generate external response 160 containing a verification datum as a function of input user identification data. As used in this disclosure, a "verification datum" is an element of data related to a result of data verification. In some cases, verification datum may include a data structure containing values representing yes-or-no answers; for instance, and without limitation, verification datum may include value in Boolean data type such as "TRUE" or "FALSE." Remote server 152 may calculate a current age of the users based on received user identification data, and compare the current age with an age threshold such as, without limitation, value of 21. External device 132 may generate a verification datum of "TRUE" if current age exceeds age threshold. On the other hand, external device 132 may generate a verification datum of "FALSE" if current age below age threshold. Such verification datum may be embedded into external response 160; for instance, and without limitation, remote server 152 may write verification datum into the response body of external response 160. External device 132 may be further configured to output and/or transmit external response 160 containing verification datum to wireless communication device 136. User may be valid (>21) if and only if external response containing a transaction status of 200 and "TRUE" as verification datum, while external response containing a transaction status of 400 and a verification datum with "FALSE" value may indicate an invalid user (<21).

With continued reference to FIG. 1, processing circuit 124 is configured to modify an internal state 164 of processing circuit 124 as a function of external response 160. "Modify," as described in this disclosure, means change, update, or otherwise modify, by processing circuit 124, internal state 164 based on external response 160. For instance, and without limitation, processing circuit 124 may change internal state 164 according to transaction status and/or response body of external response 160 as described above. As used in this disclosure, an "internal state" is a value representing an internal property, attribute, or otherwise a status of processing circuit 124. Internal state 164 may include binary states. A "Binary state," for the purpose of this disclosure, is a state in which only two values are possible, in which processing circuit 124 may only have one or the other at a time. In some embodiments, internal state 164 of processing circuit 124 may include a first binary state and a second binary state. Modifying internal state of processing circuit 124 may include switching internal state 164 between first binary state and second binary state. In a non-limiting example, internal state 164 of processing circuit 124 may be represented in Boolean algebra. At any given moment, every terminal of processing circuit 124 may be in one or the two binary states; for instance, and without limitation 0 (i.e., FALSE) or 1 (i.e., TRUE).

Still referring to FIG. 1, in some embodiments, processing circuit 124 may be implemented in away consistent with a state machine. As used in this disclosure, a"state machine" is a mathematical abstraction used to design algorithms, such as, without limitation, any processing step described in this disclosure. State machine may be constructed by logic gates. In some cases, logic gates may include, without limitation, OR gate, AND gate, NOT gate, NAND gate, NOR gate, EXOR gate, EXNOR gate, and the like thereof. One skilled in the art, after having reviewed the entirety of this disclosure, will recognize various logic gates that may be employed by processing circuit 124. State machine may read a set of inputs such as, without limitation, external response 160 and change to a different state, such as, without limitation, internal state 164, based on the inputs. External response 160 may be the form of signal as described above. State machine may accept and process such external response 160, and/or match external response 160 to an internal state. For instance, and without limitation, processing circuit 124 may be configured to determine internal state 164 such as, without limitation, first internal state, or second internal state, based on signal frequency (Hz) of external response 160. In an embodiment, state machine may include a deterministic finite state machine, wherein the deterministic finite state machine is a type of state machine which allows only one possible transition for a given input. A "transition," as described herein, is a set of actions to execute when a condition is fulfilled, and/or an event received. Actions may include any processing steps described in this disclosure. In a non-limiting example, processing circuit 124 with deterministic finite state machine may be configured to perform "if-else" statement. Processing circuit 124 may include an initial internal state, wherein the initial internal state is a default state which may be either first binary state or second binary state. Upon receiving external response 160, deterministic finite state machine may be configured to change initial internal state to other internal state based on external response 160; for instance, and without limitation, deterministic finite state machine may change initial internal state of 0 to state of 1 if transaction status is 200 and keep initial sternal state of 0 otherwise. Additionally, or alternatively, internal state 164 of processing circuit 124 may include more than two states. In a non-limiting example, internal state 164 may include three states such as "00," "01," and "11" (i.e., FALSE, NATURAL, and TRUE).

With continued reference to FIG. 1, processing circuit 124 is configured to determine a device usability 168 as a function of modified internal state 164. As used in this disclosure, a "device usability" refers to a degree to which user may use apparatus 100's primary or secondary functions; for instance, and without limitation, vaping using apparatus 100. In some embodiments, device usability 168 may include what functionalities of apparatus 100 user may use and/or may not use. In some cases, functionalities of apparatus 100 may include, without limitation, powering on/off, initiating/terminating vaporization of aerosolizable material, configuring aerosol generation mechanism (i.e., adjusting temperature), changing aerosolizable material, and the like thereof. In some embodiments, processing circuit 124 may determine a device usability based on first internal state such as, without limitation, state of "0," wherein the device usability may determine that apparatus 100 does not have any functionalities described above. Processing circuit 124 may determine a device usability based on second internal state such as, without limitation, state of "1," wherein the device usability may determine that apparatus 100 has all of the functionalities described above. In other embodiments, device usability 168 may determine usability of at least a portion of functionalities described above; for instance, and without limitation, apparatus 100 containing processing circuit 124 with internal state such as first binary state may still be able to power on and off, however, apparatus 100 may not be able to start vaporization of aerosolizable material. In a non-limiting example, device usability 168 may globally determines a state of operation of apparatus 100 in question.

With continued reference to FIG. 1, processing circuit 124 is configured to configure control circuit 116 as a function of device usability 168. In some embodiments, configuring control circuit 116 may include disabling control circuit 116 as a function of device usability 168. In a non-limiting example, disabling control circuit 116 may include disconnecting one or more connections between elements, components, and/or devices within apparatus 100 that are connected to control circuit 116. For instance, and without limitation, disabling control circuit 116 may include cutting off power supplies for aerosol generation mechanism 120 such as, without limitation, heating element, from power source 108; therefore, shut off vaporization feature of apparatus 100. In a non-limiting example, control circuit 116 may include a relay. As used in this disclosure, a "relay" is an electrically operated switch. Relay may include a set of input terminals for a single or multiple control signals such as, without limitation, external response(s) 160. In some embodiments, relay may include one or more contacts in multiple contact forms, such as, without limitation, make contacts, break contacts, or combinations thereof. In some embodiments, contacts may be close or open through electromagnet, semiconductor, and the like thereof. Processing circuit 124 may configure relay within control circuit 116 to break the contact between one or more elements, components, and/or devices with power source 106; for instance, and without limitation, the contact between power source 108 and heating element of aerosol generation mechanism 120. In other embodiments, configuring control circuit 116 as a function of device usability 168 may include enabling control circuit 116 as a function of device usability 168. In a non-limiting example, enabling control circuit 116 may include connecting and/or reconnecting one or more connections between elements, components, and/or devices within apparatus 100 that are connected to control circuit 116. For instance, and without limitation, enabling control circuit 116 may include reconnecting power source 108 with aerosol generation mechanism 120. User may then start vaporization process of aerosolizable material using apparatus 100. In a further non-limiting example, processing circuit 124 may be configured to lock and unlock apparatus 100, using control circuit 116 and processing steps described above, at the point of purchase. Processing circuit 124 with wireless communication device 136 with NFC chip 140 may be integrated into the bottom of apparatus 100 inside of outer body 104. Additionally, or alternatively, processing circuit 124 may be configured to be on/off based on device usability 168. In a non-limiting example, processing circuit 124 may be completely turn off based on device usability 168 determined based on external response 160 containing data indicate apparatus 100 belongs to a defective batch. Elements of processing circuit 124, such as, without limitation, microcontroller, memory, and the like may be locked when processing circuit 124 is off. Apparatus 100 may only be activated when NFC chip 140 receives external response 160 containing instructions to unlock elements of processing circuit 124, for example, and without limitation, the microcontroller. In a non-limiting example, external response 160 may include a recall message, generated and/or issued by remote server 152 based on identification data 128, wherein the recall message is a message indicating a device recall (i.e., request to return, exchange, or replace apparatus 100) determined by manufacturer; for instance, and without limitation, device recall may be issued when manufacturer discovers defects of apparatus 100 that could hinder performance, harm consumers, or produce legal issues for the producers. For any device with at least a portion of identification data 128 that matches data within predetermined identification data (i.e., identification data of device in a defective batch) stored in remote server 152 may receive external response 160 with recall message as response body, control circuit 116 may be locked, by processing circuit 124, in response to such external response 160.

Figure 2:
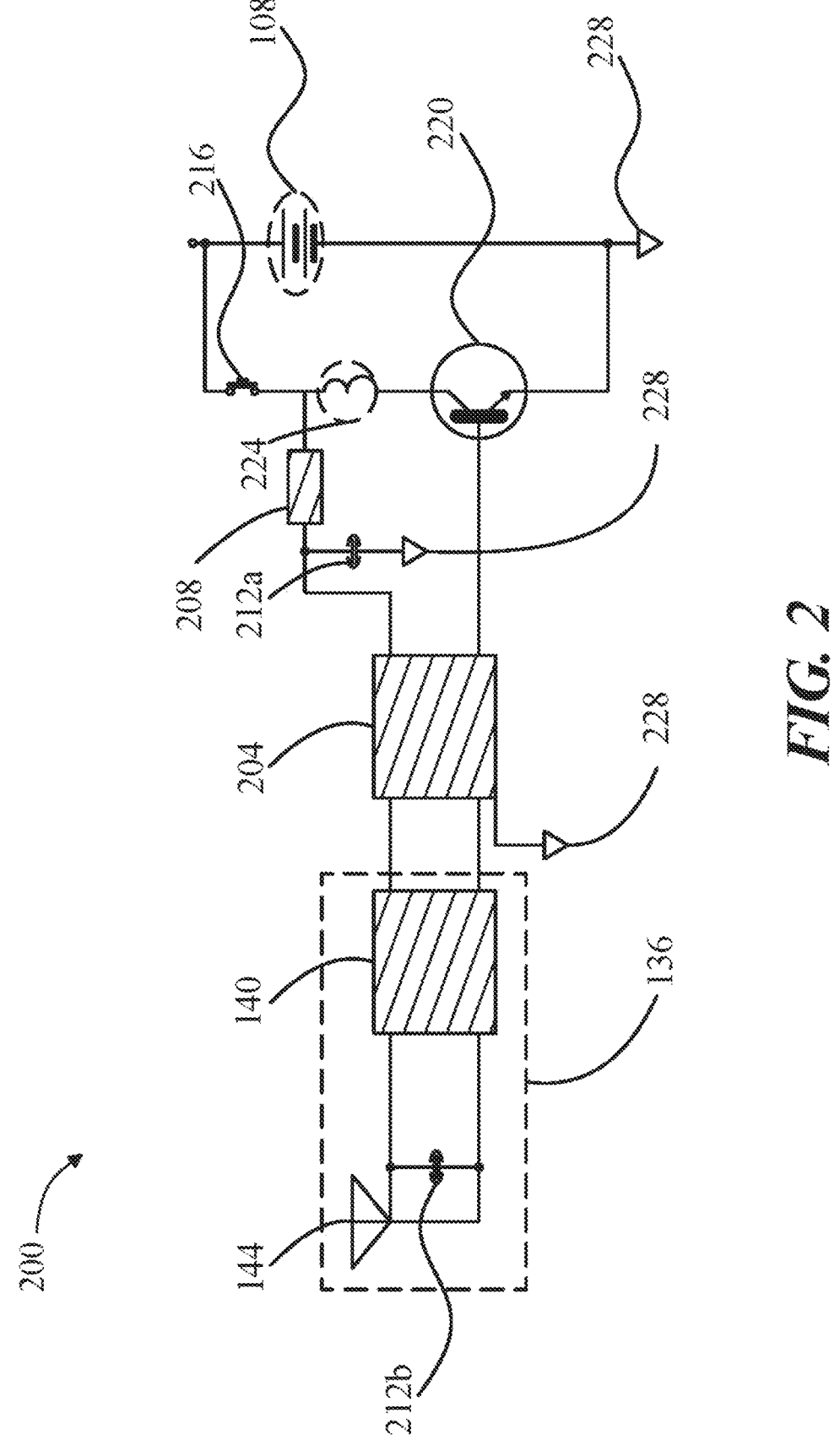
FIG. 2 is an exemplary circuit diagram of a system circuit for aerosol delivery device.

Now referring to FIG. 2, an exemplary circuit diagram of a system circuit 200 for aerosol delivery device is illustrated. Aerosol delivery device may include apparatus 100 as described above. In some embodiments, system circuit 200 may include a combination of control circuit 116 and processing circuit 124 as described above. In some embodiments, system circuit 200 may be integrated on a printed circuit board assembly (PCBA). In some embodiments, external response 160 such as, without limitation, an electronic signal generated and/or transmitted from external device 132 may be accepted and/or received by communication device 136 through antenna 144. Antenna 144 may include any antenna described above. In some cases, communication device 136 may include more than one antenna, wherein each antenna is configured to pickup different external response. Antenna may convert external response 160 into voltage and/or current used by system circuit 200. In a non-limiting example, a first antenna may be configured to pick up a first external response and a second antenna may be configured to pick up a second external response, wherein the first external response may be converted into a first current while the second external response may be converted into a second current. Current may then be direct into NFC chip 140 connected to antenna 144 as describe above.

With continued reference to FIG. 2, system circuit 200 may include a microcontroller unit (MCU) 204. In some embodiments, MCU 204 may works as a computing device on a metal oxide semiconductor (MOS) integrated circuit (IC) chip. MCU 204 may communicate between wireless communication device 136 containing NFC chip 140, and rest of components within system circuit 200, such as, without limitation, power source 108, heating element 208, LED and the like thereof. Power source 108 may include any power source described above; for instance, and without limitation, a battery. In some embodiments, power source 108 may interfere with single of NFC chip 140; for instance, and without limitation, interference caused by aluminum from the battery. A magnetic insulator may be used to mitigate such interference. Heating element 208 may include any heating element within aerosol generation mechanism 120 described above. Additionally, or alternatively, MCU 204 may perform any processing step described in this disclosure. For instance, and without limitation, MCU 204 may determine and/or modify internal state 164 based on current and/or voltage flow from NFC chip 140 through it. Internal state 164 may include any internal state 164 described above such as, without limitation, first binary state and second binary state.

With continued reference to FIG. 2, system circuit 200 may include one or more capacitors 212*a-b*. As used in this disclosure, a "capacitor" is a component that temporarily stores electrical energy through distributing charged particles a plurality plates (generally two) to create a potential difference. In some embodiments, capacitors 212*a-b* may take a shorter time than power source 108 to charge up. In some embodiments, capacitors 121*a-b* may release all stored electric energy stored in a short amount of time. In a non-limiting example, MCU 204 may be connected to two 0.1 units Farad (uF) chip capacitors in series. Additionally, or alternatively, system circuit 200 may include a power breaker 216. Power breaker 216 may be connected with heating element 208 in series. As used in this disclosure, a "power breaker" is an electrical switch designed to protect an electrical circuit, such as, without limitation, system circuit 200, from damage caused by overcurrent/overload or short circuit. In some embodiments, power breaker 216 may be configured to interrupt current flow after protective relays detect a fault. In a non-limiting example, series of MCU 204 and capacitors 212*a-b* and servers of heating element 208 and power breaker 216 may be connected with another wire in parallel.

With continued reference to FIG. 2, system circuit 200 may include a transistor 220. As used in this disclosure, a "transistor" is a miniature semiconductor that regulates or controls current or voltage flow. In a non-limiting example, transistor may include MOS described above. In some cases, transistor may include a plurality of terminals for connection to control circuit 116 and/or processing circuit 124. In some cases, a transistor may include, without limitation, insulated-gate bipolar transistor, bipolar junction transistor, field-effect transistor, and the like thereof. In some embodiments, transistor 220 may amplify and/or generate electrical signals as a function of the current or voltage flow within system circuit 200. In other embodiments, transistor 220 may act as a switch or a gate for electrical signals. In a non-limiting example, transistor 220 may include a NPN transistor, wherein the NPN transistor is a type of bipolar junction transistor contains two n-type semiconductor materials and a thin layer of p-type semiconductor separates them, and configured to switch, amplify, filter, and/pr rectify electric power flow through it within system circuit 200.

With continued reference to FIG. 2, system circuit 200 may include an inductor 224. As used in this disclosure, an "inductor" is a passive two-terminal electrical component that stores electrical energy in a magnetic field when electric current flows through it. In a non-limiting example, inductor 224 may include an insulated wire wound into a coil. In some embodiments, inductor 224 may be configured to produce direct current (DC) to keep current flowing during the "off" switching periods (i.e., disabling control circuit 116 based on internal state of processing circuit 124), therefore enabling topographies where the output current and/or voltage may be higher than the input current and/or voltage. In a non-limiting example, inductor 224 may be connected to capacitor such as, without limitation capacitor 212*a*, to form a tuned circuit, wherein the tuned circuit may act as a resonator for oscillating current. In other words, combination of inductor 224 and capacitor 212*a* may be used as a transmitter and/or a receiver configured to produce, transmit, and/or receive radio wave with the aid of antenna 144.

With continued reference to FIG. 2, system circuit 200 may further include a ground 228 (GND). As used in this disclosure, a "ground" is a reference point in electrical circuit from which voltages are measured, a common return path for electric current and/or voltage, or otherwise a direct physical connection to the earth. In some embodiments, various components of system circuit 200 may be connected to GND 228 in order to protect users of apparatus 100 from electrical shock hazard. If internal insulation fails, dangerous voltages may appear on the exposed conductive parts such as, without limitation, power source 108, MCU 204, heating element 208, NFC 140, and the like thereof. In a non-limiting example, GND 228 may include a chassis ground, wherein the chassis ground is a link between different metallic parts of apparatus 100 to ensure an electrical connection between them. System circuit 200 may be reference-linked to a chassis while the chassis is often, but not always, linked to the Earth. In other cases, GND 228 may include a floating ground. Persons skilled in the art, upon reviewing the entirety of this disclosure, will be aware of various types of ground may be used as described herein. GND 228 may allow power breaker 216 to interrupt electrical power supply in the event of a fault.

Figure 3:
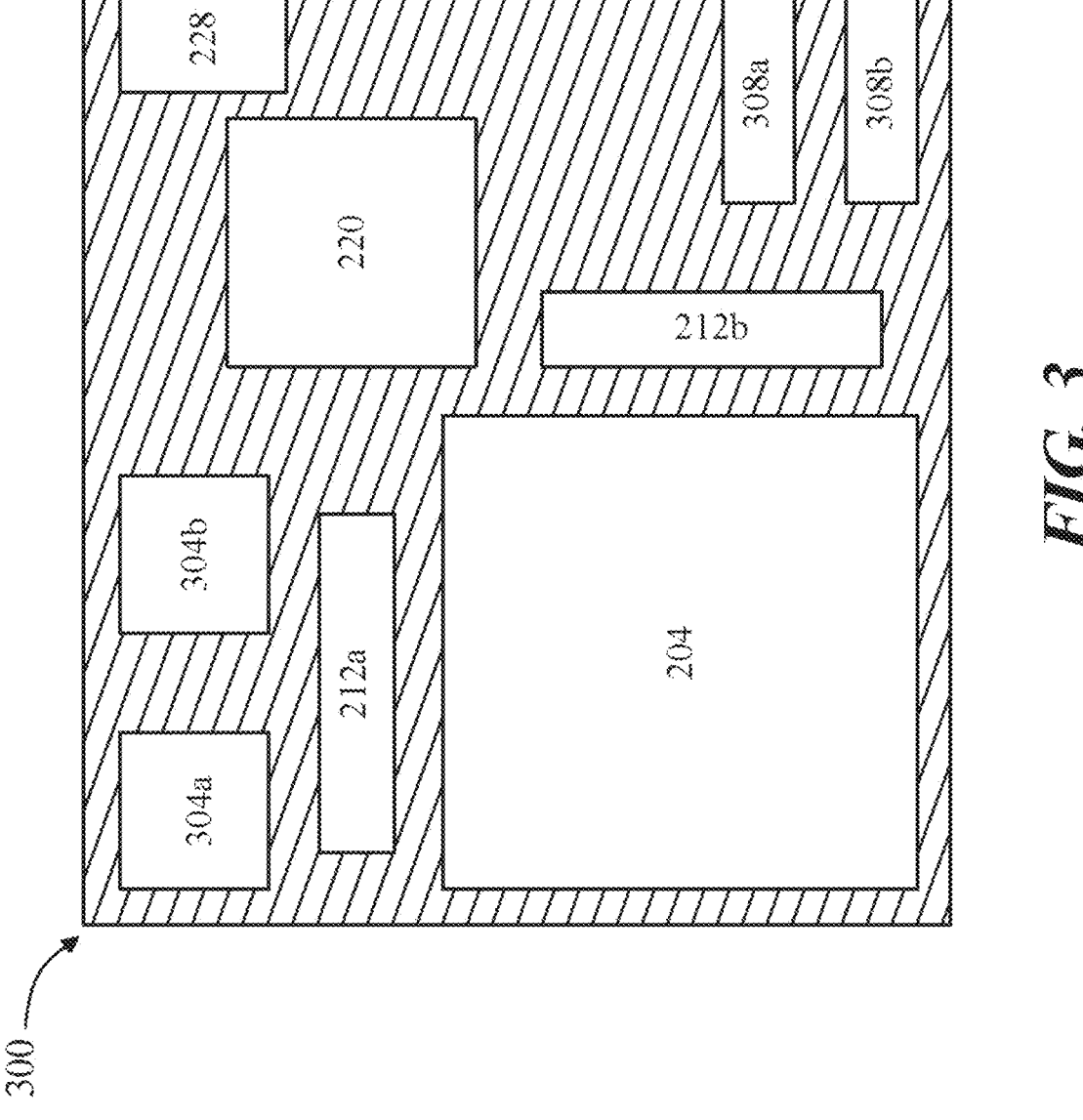
FIG. 3 is an exemplary embodiment of a printed circuit board (PCB) design.

Referring now to FIG. 3, an exemplary embodiment of a printed circuit board 300 (PCB) design is illustrated. PCB 300 may be disposed inside outer body 104 of apparatus 100 as described above in reference to FIG. 1. PCB 300 may include at least a portion of system circuit 200 described above in reference to FIG. 2. PCB 300 may include a positive pole 304*a* and a negative pole 304*b*, wherein the positive pole 304*a* may include relatively less electrons (i.e., positive polarity) than the negative pole 304*b* with negative polarity. Positive pole 304*a* and negative pole 304*b* may be connected by a conductive path, such as, without limitation, a wire, wherein the conductive path may include at least power source 108 (not shown) as described above. Wires may be separate onto both side of power source 108. Wires may be secured to power source using high temperature adhesive tape. Conductive path may include any components of system circuit 200 described above. Such connection may allow current may flow from negative pole 304*b* to positive pole 304*a* of PCB. Additionally, or alternatively, PCB 300 may include two antennas 308*a-b*. Antennas 308*a-b* may include any antenna described above such as, without limitation, antenna 144. In an on-limiting example, PCB 300 may include a first antenna 308*a* (i.e., ANT1) and a second antenna 308*b* (i.e., ANT2), wherein the ANT1 may be a 2.4/5 GHz Wi-Fi antenna and the ANT2 may be a 2.4 GHz band antenna which may be used for Wi-Fi, ZigBee, Bluetooth, or RF4CE applications. As persons skilled in the art, upon reviewing the entirety of this disclosure, will be aware of various types of antenna and antenna for other frequencies that may be used by PCB 300 as described in this disclosure. In some embodiments, NFC chip 140 (not shown) connected with antennas 308*a-b* may not be attached to PCB 300. Further, PCB 300 may include MCU 204, capacitors 212*a-b*, transistor 220, and GND 228 within system circuit 200 as described above. In a non-limiting example, transistor 220 may be on one end of PCB 300 and heating element 208 may be on another end. Magnetic insulator may be disposed in between antennas 308*a-b* and power source 108 to shield antennas 308*a-b* from aluminum on power source 108.

Still referring to FIG. 3, in some cases, instead of just locking and unlocking apparatus 100 as described above based on the external response 160, PCB 300 may be programed to activate technology such as a biometric sensor. As used in this disclosure, a "biometric sensor" is a device that captures and measures specific physiological or behavioral characteristics of the user for biometric identification or authentication. In an embodiment, biometrics may include unique and measurable traits of the user which may be used to verify user's identity and grant access to apparatus 100 (with control circuit 116 enabled). In a non-limiting example, biometric sensor may include any device that integrates fingerprint scanner, facial recognition solution, voice recognition, iris scans, palm prints, hand geometry, and/or the like to limit only authorized users from using apparatus 100 for the delivery for certain active ingredients. Apparatus 100 with PCB 300 may be activated at the point of sale (using NFC reader 148), after verifying user ID (i.e., sending identification data 128), a limited time window to fingerprint user on apparatus 100 is given to the authorized purchaser (in some cases, authorized purchaser may be the user); apparatus 100 may need to be reactivated at a point of sale (using NFC reader 148 again) to limit aftermarket sale; However, user within a specific amount of time uses a finger, for example, and without limitation, a thumb on their hand of use, biometric sensor such as a finger printer scanner may be allowed to take shots from a few angles. Such fingerprint scan may then be used to reactive apparatus 100 (either per inhalation, or for a specific amount of time) for the authorized user at a later time.

Figure 4:
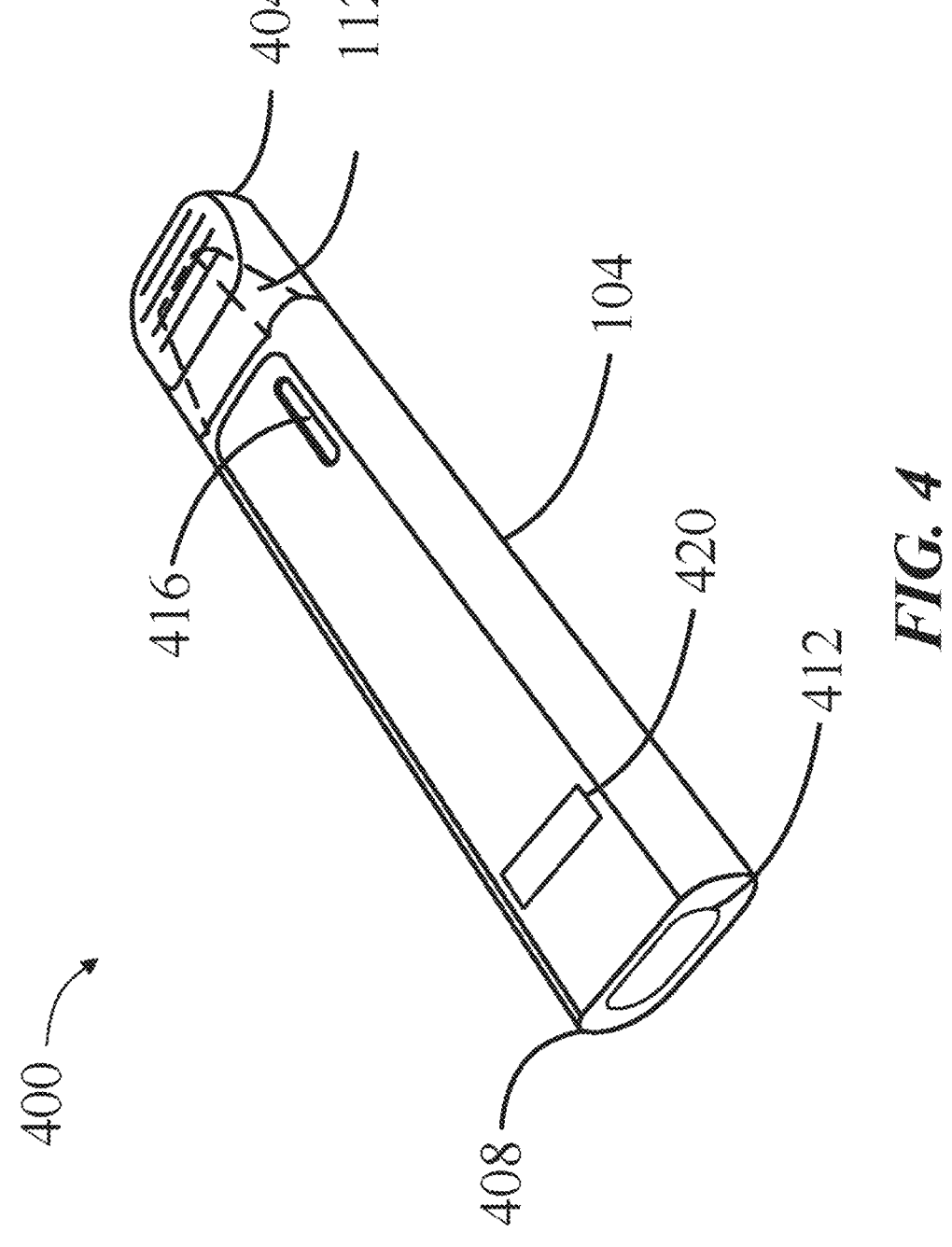
FIG. 4 is an exemplary embodiment of an outer body of aerosol delivery device.

Referring now to FIG. 4, an exemplary embodiment 400 of outer body 104 of aerosol delivery device is illustrated. Outer body 104 may encapsulate internal elements, components, and/or devices described above in reference to FIGS. 1-3, such as, without limitation, power source 108, aerosolizable material reservoir 112, control circuit 116, aerosol generation mechanism 120, processing circuit 124, and the like thereof. In some embodiments, outer body 104 may include a variety of shapes. In some cases, outer body 104 may include a flat cylinder shape. In a non-limiting example, outer body 104 may be designed in a shape comparable to an actual cigarette. In some embodiments, outer body 104 may be detachable from apparatus 100. In a non-limiting example, Outer body 104 may be detachable from a cartridge, wherein the cartridge may include one or more internal elements, components, and/or devices listed above. Apparatus 100 may include a mouthpiece 404 at a first end of outer body 104. In some embodiments, mouthpiece 404 may be located on an opposite end to bottom 408 at a second end of outer body 104. Mouthpiece 404 may be an element of apparatus 100 through which a user inhales vapor, as described above. In some embodiments, mouthpiece 404 may include an aperture through which vapor is drawn when a user inhales, a passage through which vapor passes to the aperture, one or more inlets to permit passage of air through mouthpiece 404, and/or any other suitable feature. Mouthpiece 404 may be tapered or otherwise shaped to fit in a user's mouth with ease and comfort.

With continued reference to FIG. 4, in a non-limiting example, bottom 408 of outer body 104 may include a charging connector 412, wherein the charging connector 412 may include any circuit or circuit element by means of which electric power may be transferred from an external power source to power source 108, as described above. For instance, and without limitation, charging connector 412 may include an inductive charging coil whereby electrical power is transferred to the inductive charging coil using a varying exterior magnetic field supplied by another device or a conductive connection from the apparatus 100 to an exterior device. A non-limiting example of a conductive connection may include two or more charge contacts, which may be constructed of conductive material and accessible from an exterior surface of outer body 104, such as, without limitation, bottom 408. Charge contacts may be in electrical communication with power source 108 inside of outer body 104; charge contact pins may be visible on the exterior of outer body 104. When apparatus 100 is connected to an external power source, charging pins may facilitate electrical communication between the power source 108 inside of apparatus 100 and the external power source. Charging pins may be electrically connected to power source 108 via any suitable connection; for instance, and without limitation, charging pins may contact one or more conductive elements including springs, clips, and/or a printed circuit board (PCB). Charging pins may include male and/or female connectors; for instance, charging pins may include a "plug" that projects from bottom 408 of outer body 104 or may include holes into which a plug or one or more projecting conducting pins may be inserted. Additionally, or alternatively, charging connector 412 on bottom 408 may include a magnetic contact.

Additionally, or alternatively, and still reference to FIG. 4, outer body 104 may include an end-cap. As used in this disclosure, an "end-cap" is a removable cover element that covers an end of outer body 104. In a non-limiting example, end-cap may close off mouthpiece 404 at first end of outer body 104. End-cap 416 may be attached to outer body 104 in any suitable manner, including without limitation a press-fit, snap fit, adhesion, fusion, fastening, or the like; end-cap may be formed as an integral portion of outer body 104.

With continued reference to FIG. 4, in some embodiments, a status indicator 416 may be disposed on any surface of outer body 104. As used in this disclosure, a "status indicator" is an element that continuously indicates one or more status of apparatus 100. Status of apparatus 100 may include, without limitation, internal state 164 of processing circuit 124, state of power source 108, state of aerosol generation mechanism 120 and the like, as described above. In some embodiments, status indicator 416 may include a passive status indicator, wherein the passive status indicator may be a status indicator 416 with physical configurations on outer body 104 which enables one or more indications of current apparatus state. In a non-limiting example, passive status indicator may be disposed on a surface of outer body 104 with a portion of the surface is transparent and/or hollow. User may observe elements, components, or otherwise devices inside outer body 104 through such portion of the surface (i.e., passive status indicator) to know status of apparatus 100. For instance, and without limitation, status indicator 416 may include a liquid fill level indicator, wherein the liquid fill level indicator may passively allow user to acknowledge the amount of aerosolizable material remaining within aerosolizable material reservoir 112, as described above, by disposing liquid fill level indicator on the surface of outer body 104 that right above aerosolizable material reservoir 112. In other embodiments, status indicator 416 may include an active status indicator, wherein the active status indicator may be a status indicator 416 with electrical configurations inside outer body 104 which enables one or more indications of current apparatus state. In a non-limiting example, active status indicator may include an indicator light located on outer body 104. Indicator light may include any light-emitting electronic component, including without limitation a light-emitting diode (LED). Continuing the non-limiting example, liquid fill level indicator may include a LED configured to indicate a detected liquid fill level of aerosolizable material reservoir by illuminating various color of lights; for instance, and without limitation, liquid fill level indicator may illuminate green light when aerosolizable material reservoir is at full capacity and illuminate red light when aerosolizable material at low capacity. In other embodiments, active status indicator may also indicate, without limitation, a charging status of apparatus 100; for instance, and without limitation, indicator light of active status indicator may emit light while the apparatus 100 is charging, and cease illumination when charging is complete. Indicator light of active status indicator may emit a first color of light while charging is occurring and a second when charging is complete, may blink to indicate charging is currently occurring, or the like. Any suitable pattern of illumination in response to charging status of apparatus 100 may be used. In another non-limiting example, active status indicator may indicate device usability 168, as described above. Indicator light of active status indicator may emit, without limitation, color"green" when control circuit 116 is enabled, and color "red" when control circuit 116 is disabled.

With continued reference to FIG. 4, additionally, or alternatively, a biometric reading window 420 may be disposed of outer body 104. As used in this disclosure, a "biometric reading window" is a designated area or surface on outer body 104 of apparatus wherein a biometric sensor such as any biometric sensor as described in this disclosure is located or integrated. In a non-limiting example, biometric reading window 420 may be recessed into outer body 104, creating a raised or flush surface. Biometric reading window 420 may enable user to interact with biometric sensor through outer body 104, allowing biometric sensor to capture and measure specific physiological or behavior characteristics of the user. In some cases, biometric sensor may include a fingerprint scanner, wherein the fingerprint scanner may be configured to capture at least a portion of user fingerprint (i.e., one or more unique patterns of ridges and valleys present on user's fingertip) and communicate with MCU to verify the user's identity and authenticate access to apparatus 100. In some cases, the size of biometric reading window 420 may be sufficient to accommodate the specific biometric sensor being used. For example, and without limitation, fingerprint sensor may require a smaller window than a facial recognition sensor. In some cases, size and/or location of biometric reading window may be determined based on ergonomic requirements for ease of use and comfort during normal operation of apparatus 100. In some cases, the surface of biometric reading window 420 may be smooth and free from any imperfections that might interfere with biometric sensor ability to capture accurate biometric data; for instance, and without limitation, surface of biometric reading window 420 may include an oleophobic coating (applied to the sensor surface to reduce the adhesion of oils, dirt, fingerprints, and/or the like). Additionally, or alternatively, biometric reading window 420 may be incorporated into other functional elements such as, without limitation, a power button, status indicator 416, or the like.

Figure 5A:
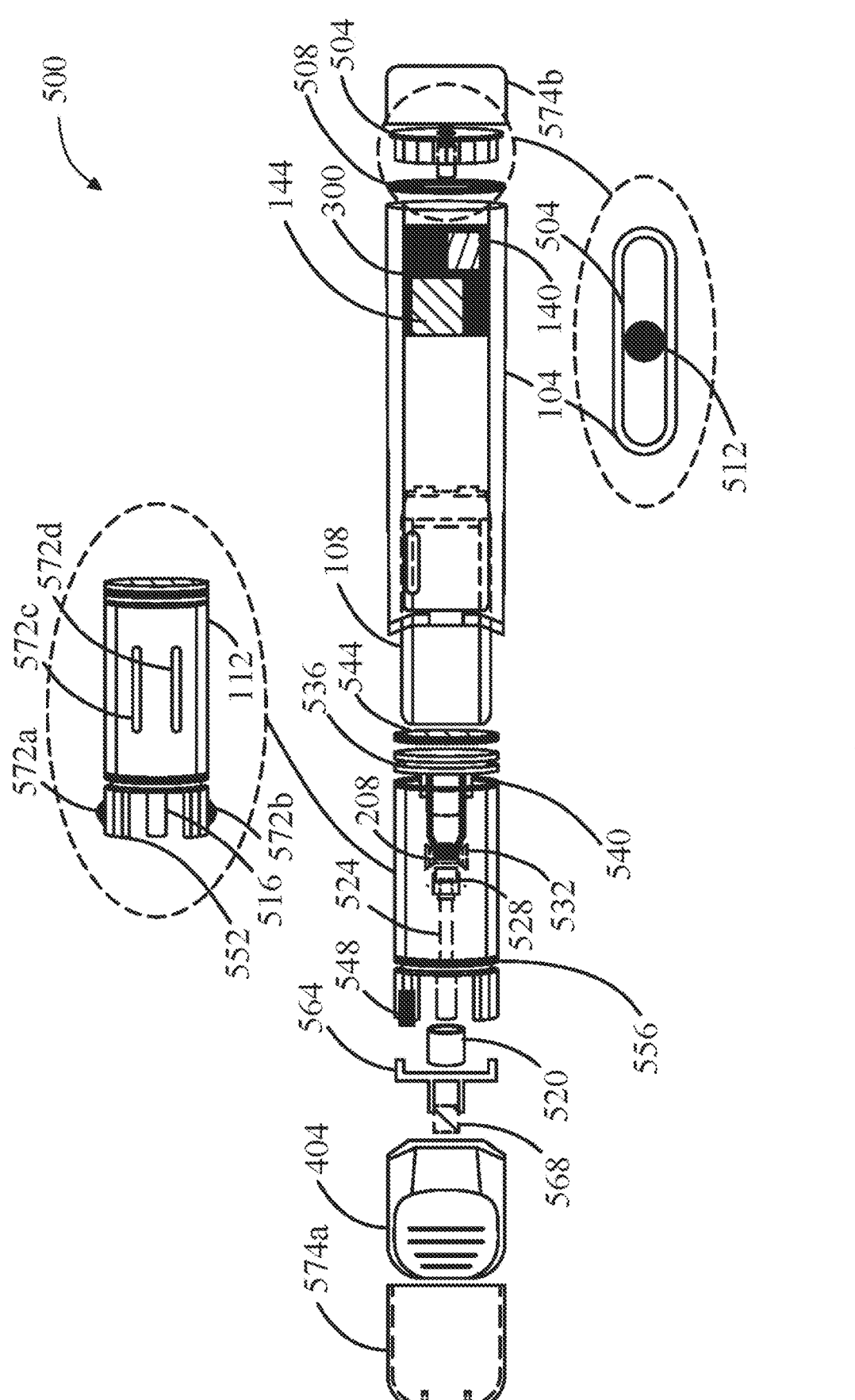

Referring now to FIG. 5A, an exemplary explosion view of apparatus 500 is illustrated. Apparatus 500 may include outer body 104 as described above with FIGS. 1 and 4. In an embodiment, outer body 104 may be made of plastic, wherein the plastic may include eco-friendly, biodegradable, or otherwise compostable plastic. In a non-limiting example, such plastic may include plant-based plastic such as poly-lactic acid (PLA), polyhydroalkanoates (PHAs), polyhydroxy butyrate (PHB), Polyhydroxyvalerate (PHV), polyhydroxy hexanoate (PHH), and the like. In another non-limiting example, such plastic may also include petroleum-based plastics such as polyglycolic acid (PGA), polybutylene succinate (PBS), Poly caprolactone (PCL), polybutylene adipate terephthalate (PBAT), Oxo-degradable polypropylene (oxo-PP), and the like. Other components of apparatus 500 such as, without limitation, mouthpiece 404, cotton holder 552, reservoir 112, and end cap 504 may be made of such plastic as well. Further, required pieces with more elasticity such as a reservoir plug 504 or a seals 548, 544 and 532 may be made of such plastic as well, as long as required elasticity requirements are made that are similar to certain types of silicone. In a non-limiting example, battery (i.e., power source 108) within outer body 104 may also be eco-friendly by implementing biodegradable electrolytes, as well as replacing non-biodegradable, petroleum-based polymers with those that can easily degrade, thereby minimizing the usage of non-renewable resources in power source 108. By removing metals, using biodegradable polymers, and implementing biodegradable electrolytes, batteries may become biodegradable themselves. However, even if power source 108 is a lithium-ion battery, a fully biodegradable plastic construction can allow the user to take out the battery of the device, recharge it, and reinsert it into a new body while composting or disposing of the old body. In this embodiment, the disposable unit would be biodegradable, and the battery would be recharged by the user and reinserted into a new disposable body. This construction, a form of a rechargeable disposable, may require a battery holder that is insertable into the body and protects the user from handling a battery directly. Further, this construction may have a pair of pins or another method of forming an electrical connection with the heating element upon insertion, rather than being soldered together. The user may also elect to dispose the insertable battery separately in a battery recycling facility, while being able to through the biodegradable plastic unit away. Lastly, an embodiment of using biodegradable plastics described herein fits a cartridge/rechargeable battery model. If the mouthpiece were to be connected to the reservoir and aerosolization chamber, in the form of a cartridge, and that cartridge were to be insertable and detachable of the unit body containing a fixed and rechargeable battery, an electrical connection is required to form between the cartridge at insertion with the body. As the user can keep the rechargeable body but would need to continue to buy the disposable cartridges, a cartridge made entirely out of biodegradable plastics would assist the user in not having to recycle the disposable part but yet create a sustainable use for small disposable cartridges.

With continued reference to FIG. 5A, in some embodiments, outer body 104 may be constructed from an injectable mold. An "injectable mold," for the purpose of this disclosure, is a manufacturing tool for producing plastic parts such as, without limitation, outer body 104, mouthpiece 404, and/or any component of apparatus. Manufacturing outer body 104 may include using an injection molding process, wherein the injection molding process may involve a use of injectable mold configured to create specific shape and features of outer body 104. In some embodiments, injectable mold may include two halves that are clamped together, with one or more cavities in between, wherein the cavities may define the shape of outer body 104. In some cases, material such as, without limitation, BIOGRADE B-M (i.e., blend of thermoplastic starch (TPS), aliphatic polyesters (AP) and natural plasticizers (glycerol and sorbitol)) may be injected into the injectable mold under high pressure, filling the space and taking on the shape of injectable mold. Other exemplary materials may include, without limitation, BIOPAR FG MO (i.e., bio-plastic resin consisting mainly of thermoplastic potato starch, biodegradable synthetic copolyesters and additives), BIOPLAST (i.e., new kind of plasticizer cherfreien thermoplastic material), ENSO RENEW RTP (i.e., renewable, biodegradable, compostable and economic thermoplastic), and/or the like. Injection molding process may include a cooling process which is configured to cool and/or solidify injected material. Injectable mold may be then opened and finished outer body 104 may be removed. In some cases, injectable mold may be precisely machined to desired shape and size of outer body 104.

With continued reference to FIG. 5A, outer body 104 may include PCB 300 containing NFC chip 140 connected with one or more antennas 144 as described above with reference to FIGS. 1-3. One end of outer body 104 may be enclosed by a body base 504. As used in this disclosure, a "body base" is a chassis of apparatus 500. In some cases, body base 504 may include a body base seal 508, wherein the body base seal 508 is a component that seals the connection between outer body 104 and body base 504, preventing leaks and ensuring proper functioning of apparatus 500. In a non-limiting example, body base seal 508 may create a tight seal when pressed against bottom 408 of apparatus 500. In other cases, body base 504 may include a base plug 512 connected to PCB 300, wherein the base plug 512 may include, without limitation, a transmitter, a separate PCB, a pressure sensor, a light element, and/or the like; for instance, base plug 512 may include a separate PCB with integrated pressure sensor. For another instance, and without limitation, base plug 512 may also include a base light, wherein the base light may be consistent with a status indicator 416 as described above with reference to FIG. 4. Additionally, or alternatively, base plug 512 may include a lighting scheme, wherein the lighting scheme may include one or more openings that allow light to shine through. In some cases, lighting scheme may include an opening in a shape of a logo or a shape of an initial of company producing apparatus 500.

With continued reference to FIG. 5A, mouthpiece 404 may fit into an opposite end of the end of apparatus 500 sealed by body base 504. In an embodiment, reservoir 112 and power source 108 (e.g., battery) may be placed within outer body 104, in between mouthpiece 404 and body base 504. In some cases, reservoir 112 may include a channel 516, wherein the channel 516 is a pathway or a passage through which aerosolized material flows. 516 is also encased by a cotton absorption pad 520, centered around 516. Channel 516 may either be molded into the reservoir as an extension of a vapor tube 524 or may be separate components. Vapor tube 524 may either be molded as part of 112 or be made of a different material and inserted later on. It's function is to transport aerosolized material from the heating chamber to the user. In a non-limiting example reservoir 112 may be in fluidic connection with heating element 208 such as, without limitation, a heating coil (i.e., a wire coil that heated to vaporize the aerosolizable material). A vapor channel seal 528 may be placed at the base of vapor tube 524 and encased the sides of heating element 208 to assist controlling of wicking and liquid flow into the heating chamber. A "vapor channel seal," as described herein, is a sealing component in apparatus 500 that ensures an airtight seal and leak-proof seal within vapor path or airway. In an embodiment, a vapor channel seal 528 may be around the coil assembly (heating element 208). A heating coil cotton 532 may be wrapped around or threaded through the heating coil, ensuring that the aerosolizable material comes into contact with the heated coil when apparatus is activated. Heating coil cotton 532 may absorb aerosolizable material, and as the heating coil heats up, vaporizing the aerosolizable material, which may be then inhaled by the user. In a non-limiting example, heating coil cotton 532 may include a wick. In some cases, vapor channel seal 528 may also be configured to perform the function of wicking/ funneling control similar to heating coil cotton 532. Additionally, or alternatively, heating element 208, vapor channel seal 528, and heating coil cotton 532 may be disposed inside reservoir 112 isolated from the aerosolizable material. Further, vapor channel seal 528 may serve as a seal with vapor tube; However, it also forms an aerosolization chamber when vapor channel seal 528 is inserted onto heating element 208 connected with the reservoir base 536 (i.e., liquid chamber deck).

Still referring to FIG. 5A, a reservoir base 536 may connect to reservoir 112. As used in this disclosure, a "reservoir base" refers to the base section of reservoir 112 which connected to heating element 208 (i.e., heating coil) and allows the wicking material such as, without limitation, heating coil cotton 532 to absorb aerosolizable material and deliver it to heating element 208 for vaporization. In a non-limiting example, reservoir base 536 with or without heating element 208, vapor channel seal 528, and/or heating coil cotton 532 attached may be inserted into reservoir 112 in a direction consistent with body base 504, along with a reservoir base seal 540, wherein the reservoir base seal 540 serves to prevent aerosolizable material from leaking out of reservoir 112 onto reservoir base 536 or other internal components such as, without limitation, power source 108, PCB 300, and/or the like. Additionally, or alternatively, a reservoir battery seal 544 may be disposed in between reservoir 112 and power source 108 (i.e., under reservoir base 528 and above power source 108), wherein the reservoir battery seal 544 serve as a secondary protection for power source 108, preventing aerosolizable material from leaking out through reservoir base 536 into power source 108.

Still referring to FIG. 5A, reservoir 112 may include a reservoir fill port seal 548. In an embodiment, reservoir 112 may include a reservoir fill port 552, wherein the reservoir fill port 552 is a small opening on reservoir 112 and/or outer body 104 of apparatus 500 that allows user to fill reservoir 112 with user-preferred aerosolizable material. In some cases, reservoir fill port may be located on the top of reservoir 112 and covered by reservoir fill port seal 548. As described herein, a "reservoir fill port seal" is a seal that prevents aerosolizable material from leaking out of the reservoir fill port and onto apparatus 500. In some cases, reservoir fill port seal 548 may include a removable cap or plug. Once reservoir 112 is filled, reservoir fill port seal 548 may be placed into reservoir fill port 552, sealing the reservoir fill port 552 and preventing e-liquid from leaking out. Reservoir 112 may further include a reservoir seal 556 disposed at the opposite end of reservoir base seal 540. In a non-limiting example, reservoir seal 556 may be placed around reservoir fill port seal 548 and reservoir fill port 552. Snapping of mouthpiece 404 onto reservoir 112 may allow for both airflow management and avoiding condensation to seep outby configuring an airtight seal on top of reservoir 112. Airtight sealing both on top of reservoir 112 through reservoir seal 544 and bottom through reservoir base seal 540 may improve stability of active ingredient filled in reservoir 112 as it avoids contact with air (i.e., potential oxidation).

Still referring to FIG. 5A, reservoir 112 may include a reservoir cotton 520 wrapped around the outlet of channel 516. As described herein, a "reservoir cotton" is a component configured to absorb any excess aerosolizable material may have been vaporized by heating element 208 but not inhaled by the user, preventing any aerosolizable material from entering the user's mouth through mouthpiece 404. Further, cotton stand 564 may also be mechanically connected to mouthpiece 404 and hold a further cotton such as, without limitation, a mouthpiece cotton 568. Mouthpiece cotton 568 may be fixed on top of cotton stand inside mouthpiece 404. In an embodiment, mouthpiece cotton 568 may be in contact with the outlet of mouthpiece 404 and may be used as a filter configured to help prevent aerosolizable material from entering the user's mouth. In some cases, mouthpiece cotton 568 may also help to reduce condensation and improve the overall vaping experience.

With continued reference to FIG. 5A, reservoir 112 may include a plurality of alignment features 572a-d on the exterior. As used in this disclosure, an "alignment feature" on the exterior of reservoir 112 is a physical feature that helps to precisely and securely align and/or fix reservoir 112 within outer body 104. In a non-limiting example, reservoir 112 may be internally coupled to outer body 104 through plurality of alignment features 572a-d. In some cases, alignment feature may include one or more male alignment features 572a-b, wherein the male alignment features 572a-b may include physical features that projects outwardly from reservoir 112, while the female alignment features 572c-d may include corresponding physical feature that is recessed or indented into reservoir 112, designed to receive and align with male alignment features 572a-b. In a non-limiting example, reservoir 112 may be inserted into outer body 104 through press fit and/or snap fit. The interior of outer body may include a plurality of alignment features that match plurality of alignment features 572a-d on the reservoir 112. For instance, and without limitation, female alignment features 572c-d may include windows around reservoir 112, wherein these windows may be configured to fit plurality of male alignment features (e.g., bumps or protrusions) within outer body 104 at a desired location.

Additionally, or alternatively, and still referring to FIG. 5A, apparatus 500 may include a top/bottom seal 574a-b, wherein the top/bottom seal 574a-b. Top seal 574a may be placed over (e.g., covering) the mouthpiece 404 while bottom seal 574b may be placed over end cap 504 and some portion of outer body 104 towards end cap 504. In some cases, during fluid e.g., air or vaporized aerosolizable material travel tight top/bottom seal 574a-b, such seal may help to stabilize the pressure changes and prevent any leakage that may occur. In an embodiment, one or more rubber extrusions/inserts (within top/bottom seal 574a-b) may help further create an airtight seal by inserting the extrusions/inserts into connecting components (e.g., mouthpiece 404, end cap 504, and/or the like).

Figure 5B:
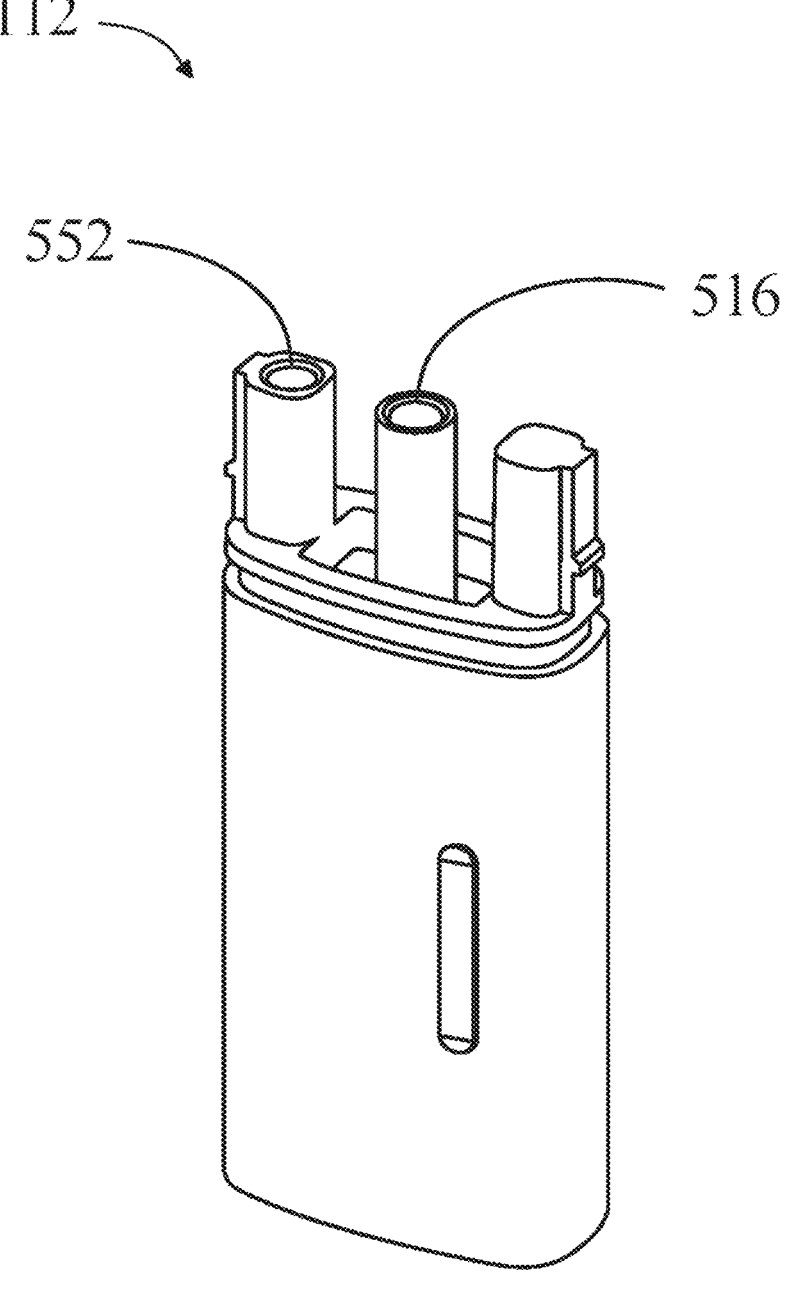

Referring now to FIG. 5B, an exemplary embodiment of a reservoir 112 is illustrated. Reservoir 108 may include any reservoir described herein. Reservoir 112 may include fill port 552 and outlet of channel 556 as described above with reference to FIG. 5A. Reservoir 112 may be made of durable PCTG plastic as described above, resistant to impact, corrosion, and heat, ensuring that the content e.g., aerosolizable material will be purely the nicotine blend. It should also be noted that reservoir 112 may be fully recyclable.

Figure 5C:
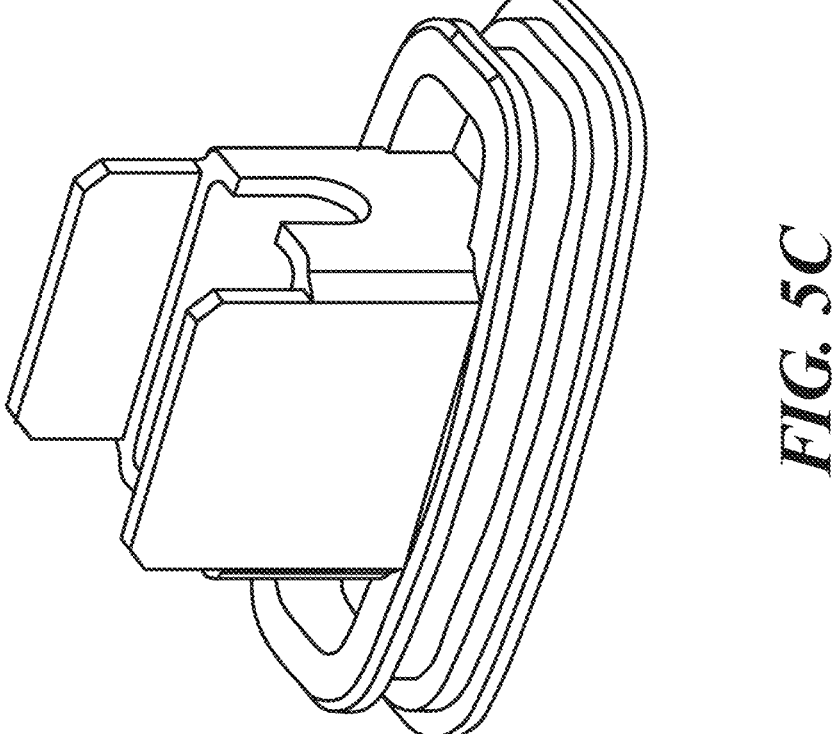

Referring now to FIG. 5C, an exemplary embodiment of a reservoir base 536 is illustrated. In some cases, reservoir base 536 may also be known as a liquid chamber deck attached to the bottom of reservoir 112 described herein. In some embodiments, reservoir base 536 may partition and tightly seal power source 108 away form reservoir 112 and heating element 208 e.g., heating coil, ensuring that vaporized aerosolizable material stays clean and pure, and power source 108 remains at a safe temperature. In some cases, reservoir base 536 may also be made of PCTG plastic as described above.

Referring now to FIG. 5D, an exemplary embodiment of vapor channel seal 528 is illustrated. In some cases, vapor channel seal 528 may include a heating chamber silicone, wherein the heating chamber silicone is where the vapor condenses. Such vapor channel seal 528 may be made of silicone rubber and may be recycled at a special silicone recycling facility. In some cases, vapor channel seal 528 may connect heating element 208 to vapor tube 524 as described above and rest, for example, and without limitation, on top of the center partition under reservoir 112.

Figure 5E:
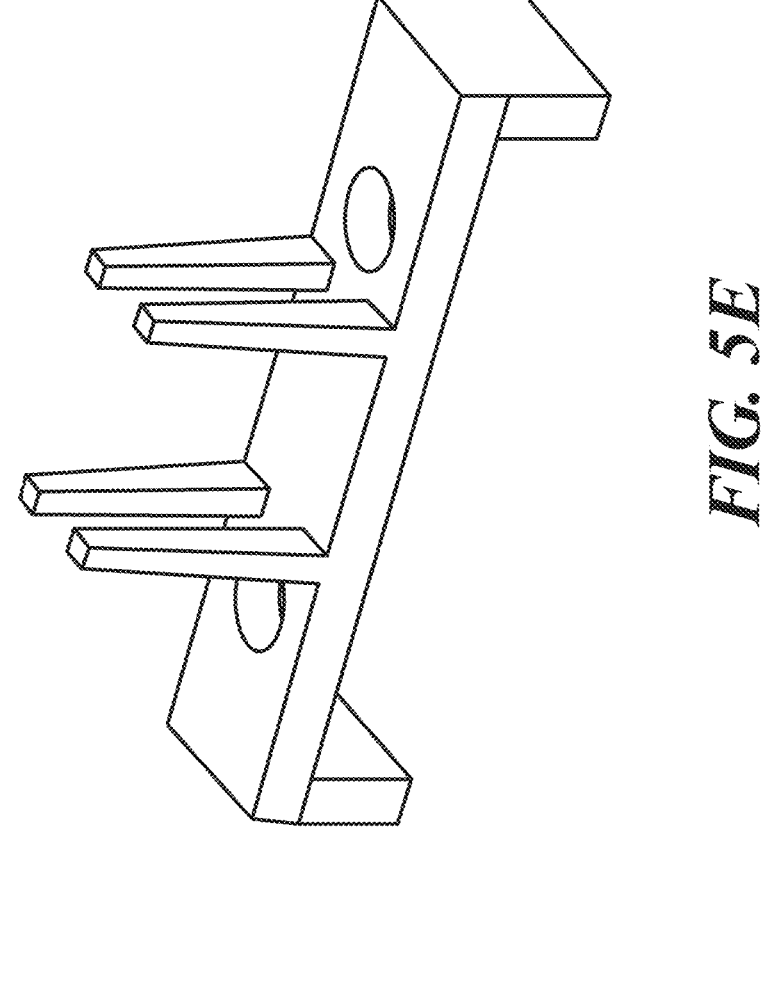

Referring now to FIG. 5E, an exemplary embodiment of cotton stand 564 is illustrated. In some cases, cotton stand 564 may be part of the fluid control mechanism as described above, wherein cotton stand 564 may be imperative in catching excess condensed vapor as it exists reservoir. In a non-limiting example, cotton stand 564 may include ABS/PC blend, which is a fully recyclable plastic. In some cases, cotton stand 564 follows the recycling code 7 for "miscellaneous" plastics.

Figure 6C:
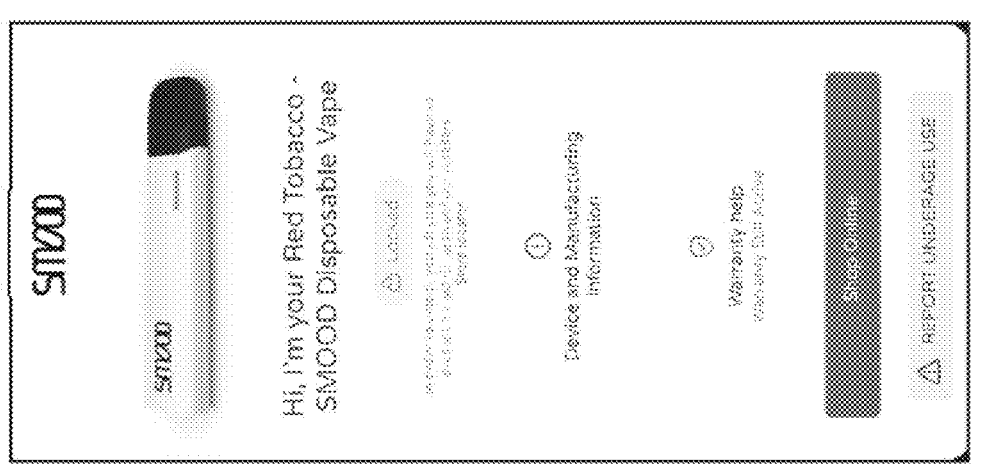
FIGS. 6A-C are exemplary embodiments of a user interface of an external device.
Figure 6B:
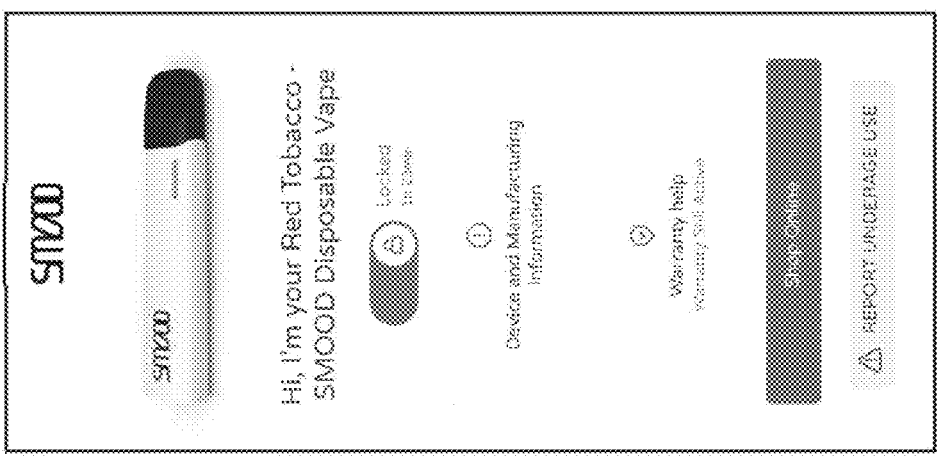
Figure 6A:
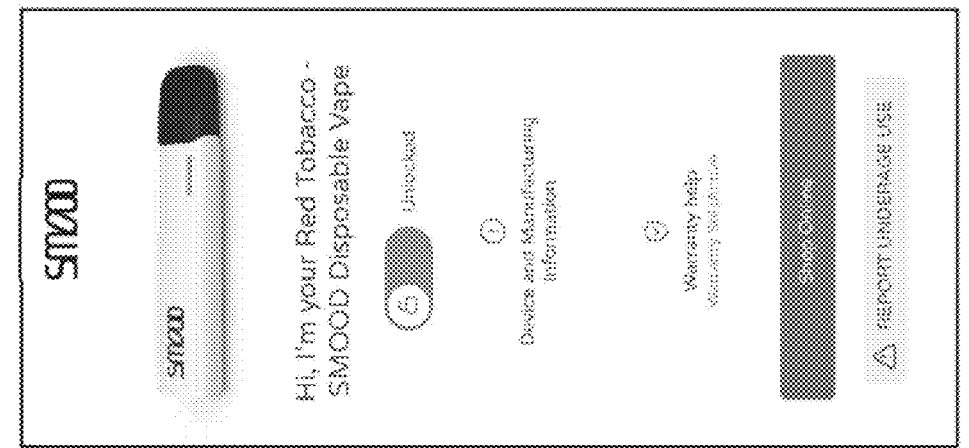

Referring now to FIGS. 6A-6C, exemplary embodiments of user interface of external device 132 are illustrated. External device 132 may include a user device such as a smartphone and may be used to lock and unlock apparatus 100 by connecting two devices via wireless communication method such as, without limitation, NFC technology as described above in reference to FIGS. 1-3. In a non-limiting example, once apparatus 100 is connected to external device

132, user interface may display a prominent lock/unlock button or toggle switch. Interaction with the lock/unlock button may lock or unlock apparatus 100, preventing or allowing its use. In a non-limiting example, when locked, as illustrated in FIGS. 6B-6C, apparatus 100 may be disabled and may not produce vapor when activated. Such feature may be helpful for child safety or preventing unauthorized use. Additionally, or alternatively, user interface may include additional features or settings. In an embodiment, user interface may also display essential information about apparatus 100 such as, without limitation, device and manufacturing information, firmware version, device warranty help, battery life, and/or the like. In another non-limiting example, user interface may furthers provide access to advanced settings such as, without limitation, temperature control, wattage adjustment, puff counter, usage statistics, and/or the like.

Still referring to FIGS. 6A-6C, additionally, or alternatively, in the absence of biometric sensor, NFC-activated device such as user device may include functionality, for example, and without limitation, prompt the user for a unique code using user interface. In some cases, unique code may include a password, series number of apparatus 100, code generated as a function of communication between external device 132 and NFC chip 140, or the like. User device may be configured to log into a website using such unique code. In some cases, using user device to control access of apparatus 100 via unique code may be done at a prespecified interval such as a week or a month. In an embodiment, user interface may include a fixed minor display containing certain pattern needs to be identified in order to unlock apparatus 100 at a specific time. This kind of dual authentication, age verification at the point of sale, and coupled with periodic verification steps may not interfere with the usability of apparatus 100. Further, unique code may also be sent to the user device for input at a randomized interval to ensure apparatus 100 are still with the user who purchased apparatus 100 originally and have not been sold in a secondary market.

Figure 7:
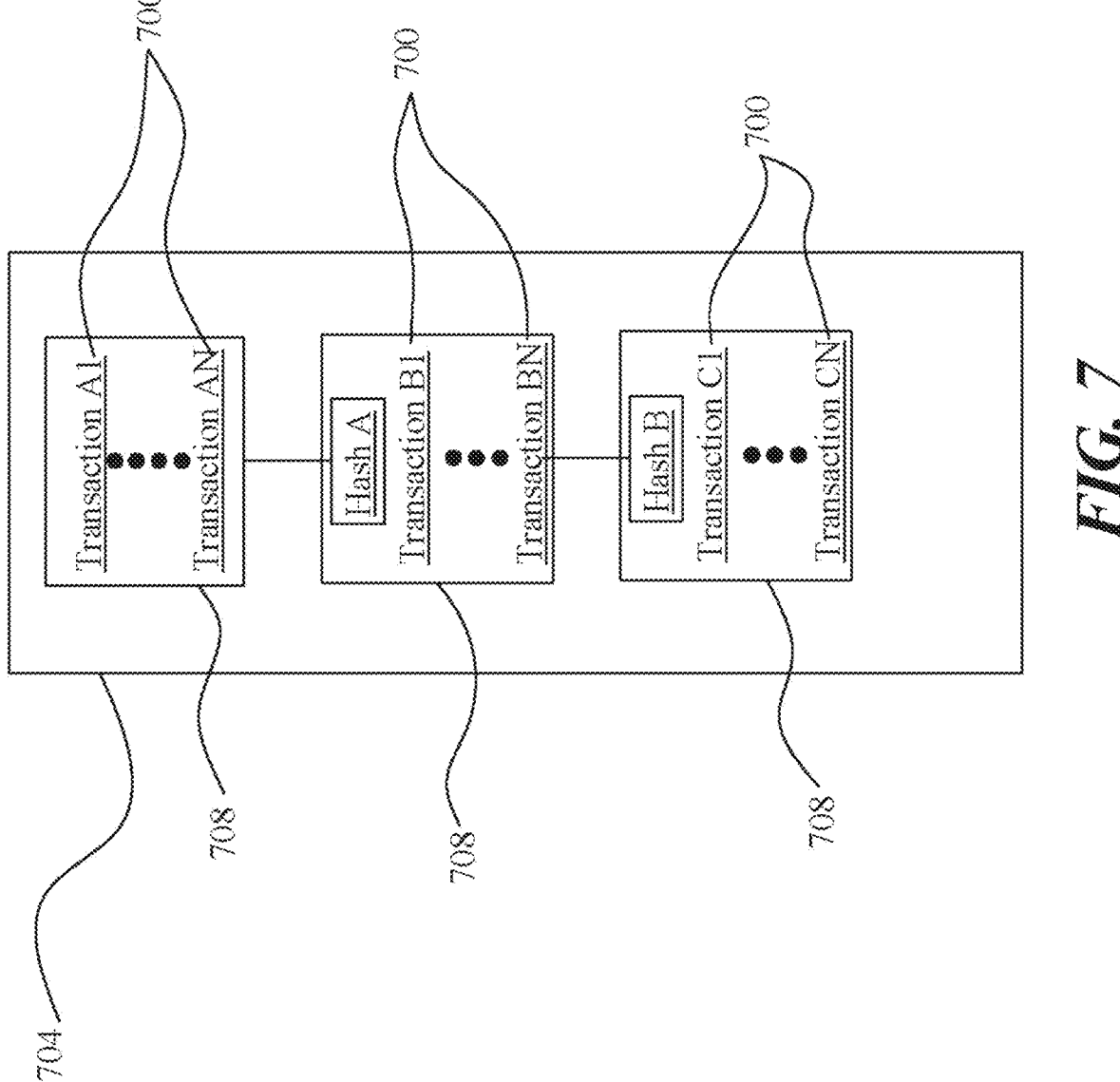
FIG. 7 is an exemplary embodiment of an immutable sequential listing.

Referring now to FIG. 7, an exemplary embodiment of an immutable sequential listing 700 is illustrated. Data elements are listed in immutable sequential listing 700; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.97 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP RETURN within the BITCOIN block chain. In other embodiments, additional data is incorporated in one signatum of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

Figure 8:
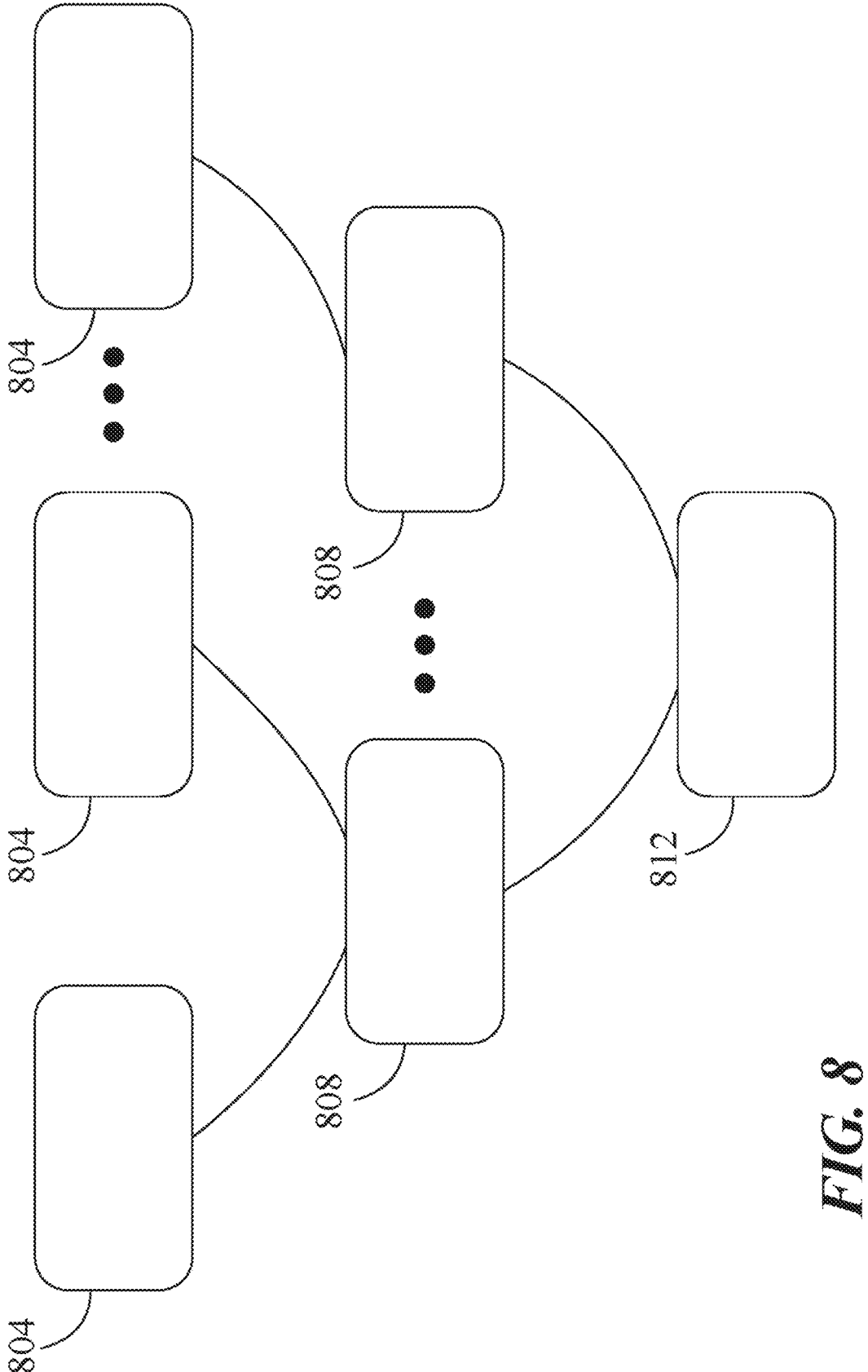
FIG. 8 is an exemplary embodiment of a cryptographic accumulator.

Referring now to FIG. 8, an exemplary embodiment of a cryptographic accumulator 800 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proof scan be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 800 has a plurality of accumulated elements 804, each accumulated element 804 generated from a lot of the plurality of data lots. Accumulated elements 804 are create using an encryption process, defined for this purpose as a process that renders the lots of data unintelligible from the accumulated elements 804; this may be a one-way process such as a cryptographic hashing process and/or a reversible process such as encryption. Cryptographic accumulator 800 further includes structures and/or processes for conversion of accumulated elements 804 to root 812 element. For instance, and as illustrated for exemplary purposes in FIG. 8, cryptographic accumulator 800 may be implemented as a Merkle tree and/or hash tree, in which each accumulated element 804 created by cryptographically hashing a lot of data. Two or more accumulated elements 804 may be hashed together in a further cryptographic hashing process to produce a node 808 element; a plurality of node 808 elements may be hashed together to form parent nodes 808, and ultimately a set of nodes 808 may be combined and cryptographically hashed to form root 812. Contents of root 812 may thus be determined by contents of nodes 808 used to generate root 812, and consequently by contents of accumulated elements 804, which are determined by contents of lots used to generate accumulated elements 804. As a result of collision resistance and avalanche effects of hashing algorithms, any change in any lot, accumulated element 804, and/or node 808 is virtually certain to cause a change in root 812; thus, it may be computationally infeasible to modify any element of Merkle and/or hash tree without the modification being detectable as generating a different root 812. In an embodiment, any accumulated element 804 and/or all intervening nodes 808 between accumulated element 804 and root 812 may be made available without revealing anything about a lot of data used to generate accumulated element 804; lot of data may be kept secret and/or demonstrated with a secure proof as described below, preventing any unauthorized party from acquiring data in lot.

Alternatively, or additionally, and still referring to FIG. 8, cryptographic accumulator 800 may include a "vector commitment" which may act as an accumulator in which an order of elements in set is preserved in its root 812 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 800 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function, but given an output it is computationally infeasible and/or impossible to generate the input that produces the output via the one-way function. For instance, and by way of illustration, a Merkle tree may be based on a hash function as described above.

Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Now referring to FIG. 9, flow diagram of an exemplary method 900 for aerosol delivery is shown. Method 900 includes a step 905 of sending, by a processing circuit, identification data to an external device. This may be implemented, without limitation, as described above in reference to FIGS. 1-8. In some embodiments, processing circuit may include a wireless communication device configured to communicate with the external device, wherein the wireless communication device may include a near field communication (NFC) chip and an antenna connects to the NFC chip. In some embodiments, identification data may include a unique identifier associated with the NFC chip. In some embodiments, the identification data may include user metadata. This may be implemented, without limitation, as described above in reference to FIGS. 1-8.

With continued reference to FIG. 9, method 900 includes a step 910 of receiving by the processing circuit, an external response generated as a function of the identification data by the external device. This may be implemented, without limitation, as described above in reference to FIGS. 1-8. In some embodiments, external device may include a remote server, and an NFC reader communicatively connected to the remote server configured to transmit the received identification data to the remote server. In some embodiments, external response may include a verification datum. This may be implemented, without limitation, as described above in reference to FIGS. 1-8.

With continued reference to FIG. 9, method 900 includes a step 915 of modifying by the processing circuit, an internal state of the processing circuit as a function of the external response. This may be implemented, without limitation, as described above in reference to FIGS. 1-8. In some embodiments, internal state of the processing circuit may include a first binary state and a second binary state. In some embodiments, modifying the internal state of the processing circuit may include switching the internal state of the processing circuit between the first binary state and the second binary state. This may be implemented, without limitation, as described above in reference to FIGS. 1-8.

With continued reference to FIG. 9, method 900 includes a step 920 of determining by the processing circuit, a device usability as a function of the modified internal state. This may be implemented, without limitation, as described above in reference to FIGS. 1-8.

With continued reference to FIG. 9, method 900 includes a step 925 of configuring by the processing circuit, a control circuit as a function of the device usability. This may be implemented, without limitation, as described above in reference to FIGS. 1-8. In some embodiments, configuring the control circuit may include disabling the control circuit as a function of the device usability. In other embodiments, configuring the control circuit may include enabling the control circuit as a function of the device usability. This may be implemented, without limitation, as described above in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
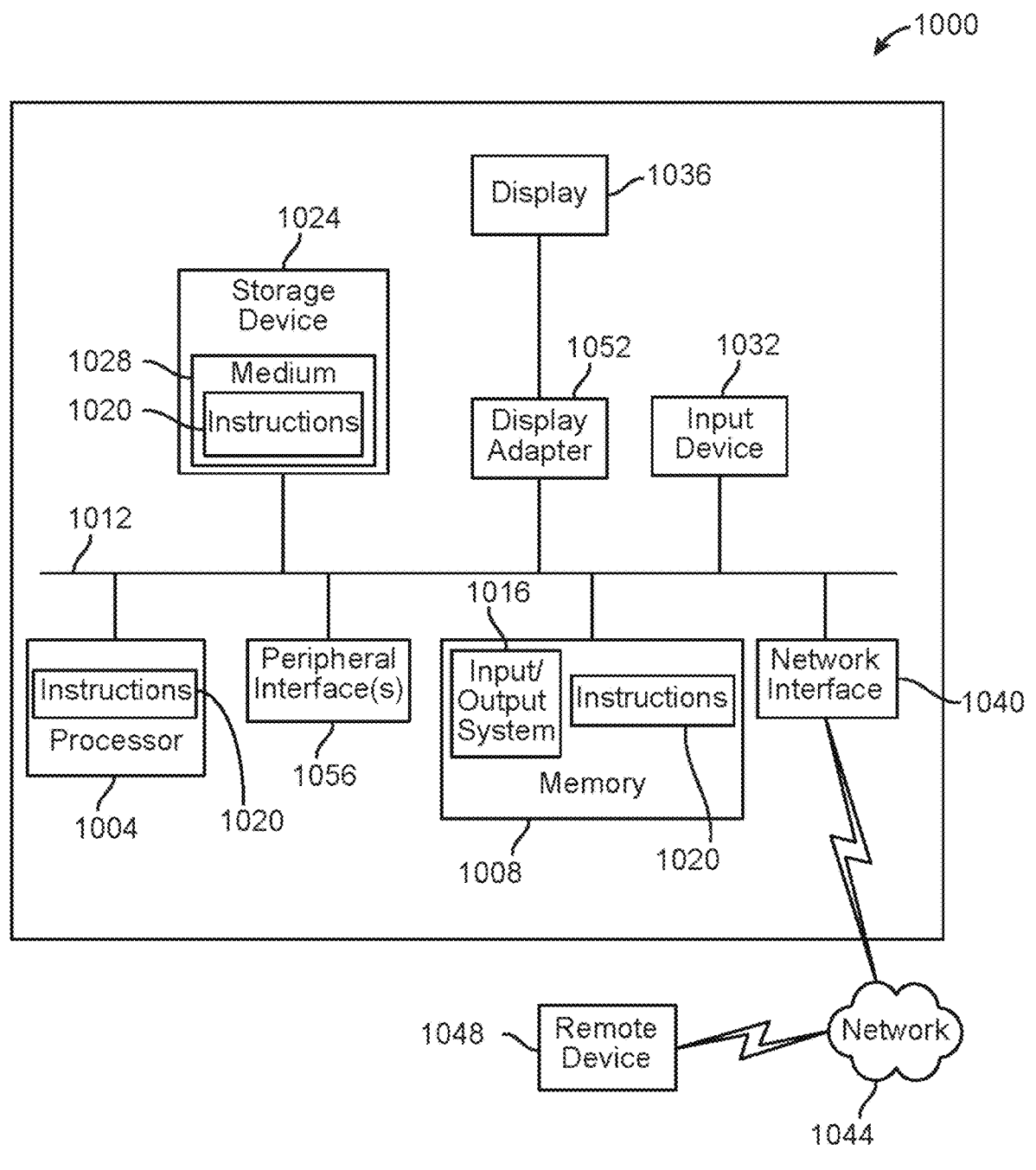
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for aerosol delivery, the apparatus comprising:

an outer body;

a power source;

an aerosolizable material reservoir;

a control circuit comprising an aerosol generation mechanism and a relay; and a processing circuit comprising a wireless communication device configured to communicate with an external device, wherein the wireless communication device comprises a near field communication (NFC) chip and an antenna communicatively connected to the NFC chip, wherein the antenna includes a transducer configured to convert a first external response into a voltage for use by the processing circuit, the processing circuit configured to:

send a first identification data associated with the apparatus to an external device, wherein the external device is an NFC reader at the point of sale configured to receive a second identification data from an identification document, and send a data received timestamp from the apparatus to a remote server; and wherein sending the first identification data further comprises cryptographically hashing the first identification data and sending the cryptographically hashed first identification data to the external device;

receive the first external response from the external device, wherein the first external response is generated as a function of the second identification data by the external device;

modify an internal state of the processing circuit as a function of the first external response and the voltage converted from the first external response;

determine a device usability as a function of the modified internal state;

configure the control circuit to enable the device as a function of the device usability, wherein configuring the control circuit comprises configuring the relay to make contact between the power source and the aerosol generation mechanism as a function of the voltage converted from the external response;

receive a second external response from the external device; and configure the control circuit to disable the device based on the second external response; and a magnetic insulator disposed between the power source and the wireless communication device, wherein the magnetic insulator is configured to mitigate interference between the power source and the wireless communication device.

2. The apparatus of claim 1, wherein the identification data comprises a unique identifier associated with the NFC chip.

3. The apparatus of claim 1, wherein the identification data comprises user metadata.

4. The apparatus of claim 1, wherein the external device comprises:

a remote server; and an NFC reader communicatively connected to the remote server configured to transmit the received identification data to the remote server.

5. The apparatus of claim 1, wherein the external response comprises a verification datum.

6. The apparatus of claim 1, wherein the internal state of the processing circuit comprises:

a first binary state; and a second binary state.

7. The apparatus of claim 6, wherein modifying the internal state of the processing circuit comprises:

switching the internal state of the processing circuit between the first binary state and the second binary state.

8. The apparatus of claim 1, wherein configuring the control circuit comprises: disabling the control circuit as a function of the device usability.

9. The apparatus of claim 1, wherein configuring the control circuit comprises enabling the control circuit as a function of the device usability.

10. The apparatus of claim 1, wherein the processing circuit is further configured to display, at a user device, an output based on the second external response.

11. A method for aerosol delivery, the method comprising:

sending, by apparatus for aerosol delivery comprising a power source, a processing circuit comprising a wireless communication device configured to communicate with an external device, wherein the wireless communication device comprises a near field communication (NFC) chip and an antenna communicatively connected to the NFC chip, wherein the antenna includes a transducer configured to convert a first external response into a voltage used by the processing circuit, and a magnetic insulator disposed between the power source and the wireless communication device, wherein the magnetic insulator is configured to mitigate interference between the power source and the wireless communication device, identification data to an external device, wherein sending the identification data further comprises cryptographically hashing the identification data and sending the hashed identification data to the external device, and wherein the external device is an NFC reader at the point of sale configured to receive a second identification data from an identification document, and send a data received timestamp from the apparatus to a remote server;

receiving, by the processing circuit, the first external response from the external device, wherein the external response is generated as a function of the identification data by the external device;

modifying, by the processing circuit, an internal state of the processing circuit as a function of the first external response and the voltage converted from the first external response;

determining, by the processing circuit, a device usability as a function of the modified internal state;

configuring, by the processing circuit, a control circuit to enable the device as a function of the device usability, wherein configuring the control circuit comprises configuring the relay to make contact between the power source and the aerosol generation mechanism as a function of the voltage converted from the external response receiving, by the processing circuit, a second external response from the external device; and configuring, by the processing circuit, the control circuit to disable the device based on the second external response.

12. The method of claim 11, wherein the identification data comprises a unique identifier associated with the NFC chip.

13. The method of claim 11, wherein the identification data comprises user metadata.

14. The method of claim 11, wherein the external device comprises:

a remote server; and an NFC reader communicatively connected to the remote server configured to transmit the received identification data to the remote server.

15. The method of claim 11, wherein the external response comprises a verification datum.

16. The method of claim 11, wherein the internal state of the processing circuit comprises:

a first binary state; and a second binary state.

17. The method of claim 16, wherein modifying the internal state of the processing circuit comprises:

switching the internal state of the processing circuit between the first binary state and the second binary state.

18. The method of claim 11, wherein configuring the control circuit comprises: disabling the control circuit as a function of the device usability.

19. The method of claim 11, wherein configuring the control circuit comprises enabling the control circuit as a function of the device usability.

20. The method of claim 11 further comprising displaying, at a user device, an output based on the second external response.

* * * * *